US010243197B2

United States Patent
Cho et al.

(10) Patent No.: US 10,243,197 B2
(45) Date of Patent: Mar. 26, 2019

(54) LITHIUM METAL ANODE COMPRISING LANGMUIR-BLODGETT FILMS AS AN ARTIFICIAL SOLID ELECTROLYTE INTERFACE LAYER, LITHIUM METAL BATTERY COMPRISING THE SAME, AND PREPARATION METHOD THEREOF

(71) Applicants: KOREA INSTITUTE OF SCIENCE AND TECHNOLOGY, Seoul (KR); Cornell University, Ithaca, NY (US)

(72) Inventors: Won Il Cho, Seoul (KR); Mun Sek Kim, Seoul (KR); In Wook Nah, Seoul (KR); Min Seop Kim, Seoul (KR); Lynden A. Archer, Ithaca, NY (US); Snehashis Choudhury, Ithaca, NY (US); Zhengyuan Tu, Nanchang (CN)

(73) Assignees: Korean Institute of Science and Technology, Seoul (KR); Cornell University, Ithaca, NY (US)

( * ) Notice: Subject to any disclaimer, the term of this patent is extended or adjusted under 35 U.S.C. 154(b) by 97 days.

(21) Appl. No.: 15/442,908

(22) Filed: Feb. 27, 2017

(65) Prior Publication Data

US 2018/0123114 A1 May 3, 2018

(30) Foreign Application Priority Data

Oct. 28, 2016 (KR) ........................ 10-2016-0141707

(51) Int. Cl.
*H01M 4/02* (2006.01)
*H01M 4/04* (2006.01)
(Continued)

(52) U.S. Cl.
CPC ......... *H01M 4/0402* (2013.01); *H01M 4/134* (2013.01); *H01M 4/1395* (2013.01);
(Continued)

(58) Field of Classification Search
CPC ........... H01M 10/05; H01M 2004/027; H01M 4/0402; H01M 4/134; H01M 4/366;
(Continued)

(56) References Cited

U.S. PATENT DOCUMENTS

| 2014/0212760 A1* | 7/2014 | Zhao | H01M 4/583 |
| | | | 429/231.8 |
| 2015/0333376 A1* | 11/2015 | Gaben | C25D 13/02 |
| | | | 429/156 |

FOREIGN PATENT DOCUMENTS

| KR | 10-2013-0128273 A | 11/2013 |
| KR | 10-2014-0022735 A | 2/2014 |

(Continued)

OTHER PUBLICATIONS

Notification for Refusal KR2016-0141707.*
(Continued)

*Primary Examiner* — Sonya M Sengupta
(74) *Attorney, Agent, or Firm* — Goldilocks Zone IP Law

(57) ABSTRACT

Provided is a lithium metal anode comprising a Langmuir-Blodgett films as an artificial solid electrolyte interface layer, a lithium metal battery comprising the same, and a preparation method thereof. Various ultra-thin film layers made of carbon and ceramic are formed on the surface of the LiM to serve as a stable artificial SEI layer and suppress formation and perforation of lithium dendrite and side reactions.

13 Claims, 19 Drawing Sheets

(51) Int. Cl.
- *H01M 4/36* (2006.01)
- *H01M 4/38* (2006.01)
- *H01M 4/62* (2006.01)
- *H01M 4/134* (2010.01)
- *H01M 4/583* (2010.01)
- *H01M 10/052* (2010.01)
- *H01M 4/1395* (2010.01)

(52) U.S. Cl.
CPC .......... *H01M 4/366* (2013.01); *H01M 4/382* (2013.01); *H01M 4/583* (2013.01); *H01M 4/62* (2013.01); *H01M 4/628* (2013.01); *H01M 10/052* (2013.01); *H01M 2004/027* (2013.01)

(58) Field of Classification Search
CPC .......... H01M 4/628; H01M 4/13; H01M 4/38; H01M 4/583; H01M 4/1395; H01M 4/382
USPC .......................... 156/242, 247; 429/188, 309
See application file for complete search history.

(56) References Cited

FOREIGN PATENT DOCUMENTS

| KR | 10-2014-0068287 A | 6/2014 |
|---|---|---|
| KR | 10-2014-0111516 A | 9/2014 |
| KR | 10-2016-0013095 A | 2/2016 |
| KR | 10-2016-0092241 A | 8/2016 |
| KR | 10-2017-0046922 A | 5/2017 |

OTHER PUBLICATIONS

Opinion according to the Notification for Refusal KR2016-0141707.*
Decision to grant patent for KR20160141707.*
Van Chinh Hoanga et al. Facile Coating of Graphene Interlayer onto Li2S as a High Electrochemical Performance Cathode for Lithium Sulfur Battery, Electrochimica Acta 210, Apr. 30, 2016, pp. 1-6.
Min-Seop Kim et al., Synthesis of graphitic ordered mesoporous carbon with cubic symmetry and its application in lithium—sulfur batteries, Nanotechnology 27, Feb. 18, 2016, pp. 125401(1-8).
Min-Seop Kim et al., The effect of V2O5/C additive on the suppression of polysulfide dissolution in Li-sulfur batteries, J Electroceram Oct. 9, 2014, pp. 142-148, vol. 33.
Eon Sung Shin et al.,Sulfur/graphitic hollow carbon sphere nano-composite as a cathode material for high-power lithium-sulfur battery, Nanoscale Research Letters , 2013, pp. 1-8.
Eon Sung Shin et al., Polysulfide dissolution control: the common ion effect, Chem. Commun., Dec. 5, 2012, pp. 2004-2006.
Kim et al., Fabricating multifunctional nanoparticle membranes by a fast layer-by-layer Langmuir—Blodgett process: application in lithium—sulfur batteries, Journal of Materials Chemistry A, Aug. 31, 2016, pp. 14709-14719, vol. 4.
Kim et al., Multifunctional Separator Coatings for High-Performance Lithium—Sulfur Batteries, Adv. Mater. Interfaces, 2016, pp. 1600450(1-8).

* cited by examiner

LITHIUM METAL ANODE COMPRISING LANGMUIR-BLODGETT FILMS AS AN ARTIFICIAL SOLID ELECTROLYTE INTERFACE LAYER, LITHIUM METAL BATTERY COMPRISING THE SAME, AND PREPARATION METHOD THEREOF

CROSS-REFERENCE TO RELATED APPLICATIONS

This application claims priority under 35 U.S.C. § 119 to Korean Patent Application No. 10-2016-0141707 filed on Oct. 28, 2016 in the Korean Intellectual Property Office, the disclosure of which is incorporated herein by reference in its entirety.

TECHNICAL FIELD

The following disclosure relates to a lithium metal anode comprising a Langmuir-Blodgett films as an artificial solid electrolyte interface layer, a lithium metal battery comprising the same, and a preparation method thereof.

BACKGROUND

The first concept of lithium ion battery (LiB) was established in 1962. Soon, rechargeable LiB was proposed by Michael Stanley Whittingham in the 1970s at Exxon, leading to the discovery of a lithium-titanium-disulfide battery. However, the commercialization of the rechargeable LiB using metallic lithium as the anode and air/water sensitive titanium disulfide as the cathode fell apart due to the weak safety of LiM and the high processing cost of titanium disulfide.

Subsequently, reversible intercalation-based graphite and cathodic oxides were developed by Jurgen Otto Besenhard to overcome the aforementioned obstacles and invent practical rechargeable LiB. In 1991, the first commercial LiBs were launched by Sony and Asahi Kasei. This was a revolutionary moment that lead to successful discoveries in portable electronics. Ever since LiB gained wide popularity, the demand for electrical energy storage has soared due to the continuous innovation of portable, everyday electronic devices such as cell phones, music players, speakers, drones, vehicles, and micro/nano sensors. Hence, researchers and scientists are progressively investigating new, advanced energy materials, chemistries and physics for static/non-static energy storage systems to further meet the growing energy demands.

As current commercial LiB technologies have reached a saturation point where only incremental improvements on the electrochemical performance of LiB are reported, new energy materials with different configurations and chemistries are needed to accommodate the ever-increasing energy demand. Thus, rechargeable batteries with LiM anodes and conversion-type cathodes such as lithium sulfur (LiS) and lithium air (LiO) batteries are considered to be the next generation of LiB due to their high energy densities and practicalities.

The sulfur and oxygen cathodes have theoretical specific energy densities of ~2,600 Wh/kg and ~11,400 Wh/kg, respectively. These values are almost 10 times higher than that of current LiB (~360 Wh/kg for $C/Co_2O_4$). Furthermore, LiM provides an exceptionally high theoretical specific capacity of ~3,860 mAh/g with very low negative redox potential (−3.04V vs S.H.E.) and a density of 0.59 g/cm$^3$. Moreover, the intercalation-type graphite anode exhibits a lower theoretical specific capacity (<372 mAh/g) with a higher negative redox potential and density. This means that the gravimetric energy density of the conventional LiB could increase dramatically by replacing the graphite anode with metallic lithium. These desirable properties of the LiM anode and conversion-type cathodes could provide a promising pathway to overcoming the high energy demand challenges in the future if LiS and LiO batteries can be commercialized soon.

Despite their assuring electrochemical characteristics, several prominent challenges are need to be resolved in order for LiM batteries to be fully commercialized. The central issue is the reversibility of the deposition/dissolution of the Li ions. The high reactivity and nonuniform deposition of Li cause various interrelated problems such as thermal runaway, decomposition of electrolytes, and loss of Li. The uneven deposition of Li ions onto the anode during the charging process leads to the formation of metallic protrusions that grow and eventually short-circuit the cell by piercing the separator. This is a serious safety concern because such a short circuit can produce large amounts of heat and sparks that may ignite the electrolyte that is comprised of flammable organic liquids. Other challenges associated with LiM battery are coulombic instabilities and side reactions that result in the battery's low capacity and short cycle life. Such instabilities arise from the continuous reaction between the LiM and the electrolyte. In each successive charge and discharge cycle, the SEI breaks down and a new SEI is formed by the reaction of the electrolyte with the exposed Li. This unwanted process leads to the continuous degradation of the electrolyte and the formation of insulating species inside the battery. These fragmented troubles hinder the commercialization of the LiM batteries especially due to safety concerns. Hence, it is essential to first create a stable solid electrolyte interface (SEI) and/or mechanical protection layers on the active lithium surface to provide uniform anchoring points that will enable the stable deposition and dissolution of the Li ion. In this scenario, formation of the ramified lithium dendrites could be effectively suppressed.

First, Cui and co-workers at Stanford University proposed isolating LiM from the electrolyte by placing an interconnected hollow carbon sphere film (thickness ~200-300 nm) in-between so as to provide an electrochemically and mechanically stable artificial SEI layer called "Hard-Film" that could block the lithium dendrites. Furthermore, Archer and co-workers at Cornell University demonstrated that LiF coated Li can retard Li dendrite growth or become dendrite-free Li by forming a stable SEI layer. Other effective chemical additives and soft SEI films have been proposed to postpone or suppress Li dendrites; however, simplified procedures of film fabrication that are also cost effective need to be developed in order to improve the practicality and safe utilization of LiM as an anode.

LiM anode protection becomes even more challenging when conversion-type cathodes are involved. Archer and Nazar demonstrated the use of highly reversible LiS batteries by employing hollow carbon nanospheres and highly ordered nanostructured carbon (i.e. CMK series) as an effective sulfur host in 2011 and 2009. Since then, interest in the LiM anode and sulfur cathode have resurged. For LiS batteries, the redox reaction between lithium and sulfur ($16Li+S_8 \leftrightarrow 8Li_2S$) occurs spontaneously and is fully reversible. Moreover, sulfur is low-priced and earth-abundant, which provides an additional incentive for the development of LiS electrochemical storage technology. However, the development of a practical LiS battery has been postponed by fundamental problems associated with multiple transport and thermodynamics. First, sulfur suffers from poor electrical conductivity ($5\times10^{-30}$ S cm$^{-1}$ at R.T.) and produces a discharge product ($Li_2S$) that has an insulating characteristic. Second, the volume of sulfur increases by ~80% when it is fully lithiated. Furthermore, the redox reaction product, $Li_2S$, is always accompanied by the formation of various dissolvable intermediate species called lithium polysulfides (LiPS $Li_2S_n$, 2<n<8), which create challenges in active material loss and reutilization. LiPS are highly soluble in organic electrolytes and therefore cause the loss of active materials in the cathode. Once present in the electrolyte, the LiPS species can diffuse through the separator and reach the Li anode, establishing an internal shuttling pathway between the Li anode and sulfur cathode. This phenomenon is known as LiPS shuttling. During shuttling, the dissolved LiPS, especially high-order LiPS, gets reduced at the surface of the Li anode and passivates the anode surface. As a result, rapid capacity fading, poor cycling lifetime, low coulombic efficiency, and chemical shorting are observed in the LiS batteries. To resolve the issue of the anode engaging in a side reaction with LiPS, the $LiNO_3$ additive is found to be very effective in protecting the LiM as it provides a protective passivation layer on the surface. However, the electrolyte additives in the LiS battery do not provide solutions for lithium dendrites. Therefore, it is urgently required that the electrochemically stable LiM anode with conversion-type (especially sulfur) as well as intercalation-type cathodes are desired to fabricate high energy density secondary batteries.

In light of these grave challenges, this invention intends to present a facile way of preparing ultra-thin artificial SEI layer films at the atmospheric condition via LBS method. Graphene is considered to be the most promising artificial SEI layer as graphene allows for the rapid diffusion of Li ions. This indicates that graphene is capable of transferring Li ions in 3 dimensional spaces and providing effective electrolyte/anode separation to prevent problematic side reactions and Li dendrites. Also, the high modulus of graphene (0.5 TPa) could block the lithium dendritic proliferation. There are several processing techniques to prepare graphene films such as dip-coating, spray coating, spin coating, inkjet printing, doctor blade, electrodeposition, vacuum filtration, drop casting, interfacial deposition, conventional Langmuir-Blodgett, and LBL assembly. Despite these various techniques for the graphene processing, there is no fast, facile, simple, and cost-effective method that yields high quality ultra-thin graphene films with precise thickness control and large-scale adoptability. Additionally, nano-ceramic materials are known as suitable protection materials for Li dendrites and separators as they have high modulus and thermal conductivity. However, the high interfacial impedance of the ceramic coatings on the anode side impedes the high power density of LiM batteries. To overcome this serious issue, a simply synthesized lithium terminated sulfonated ceramic is used as the anode protection layer. With this functionalization, a lower impedance and more stable lithium deposition/dissolution are achieved. Consequently, the functionalized ceramic is paired up with the graphene film to create multifunctional artificial SEI films. These films are then transferred to lithium to fabricate a stable and safe metallic Li anode for LiM batteries.

RELATED LITERATURES

Patent Literature

1. Korean Patent Application No. 10-2013-0025761
2. Korean Patent Application No. 10-2012-0130974
3. Korean Patent Application No. 10-2013-0096423
4. Korean Patent Application No. 10-2015-0012611

Non-Patent Literature

1. Fabricating multifunctional nanoparticle membranes by a fast layer-by-layer Langmuir-Blodgett process: application in lithium-sulfur batteries, J. Mater. Chem. A, 4, 14709-14719 (2016)
2. Multifunctional separator coatings for high-performance lithium-sulfur batteries, Adv. Mater. Interfaces, 3, 1600450 (2016)
3. Facile Coating of Graphene Interlayer onto $Li_2S$ as a High Electrochemical Performance Cathode for Lithium Sulfur Battery, Electrochimica Acta, 210, pp. 1-6 (2016)
4. Synthesis of graphitic ordered mesoporous carbon with cubic symmetry and its application in lithium sulfur batteries, Nanotechnology, 27, 125401 (2016)
5. The effect of $V_2O_5/C$ additive on the suppression of polysulfide dissolution in Li-sulfur batteries, J. Electroceramics, 33 (3-4), 142-148 (2014)
6. Sulfur/graphitic hollow carbon sphere nano-composite as a cathode material for high-power lithium-sulfur battery, Nanoscale Research Letters, 8 (1), 343-1 (2013)
7. Polysulfide dissolution control: the common ion effect, Chemical communications, 49, 2004-2006 (2013)

SUMMARY

An embodiment of the present disclosure is directed to providing a lithium metal anode, a lithium metal battery comprising the same, and a preparation method thereof, in order to solve the above problems of the existing technique. By doing so, the present disclosure is directed to providing an effective and available method for improving LiM safety and electrochemical efficacy. A LiM anode is used together with various types of cathodes such as intercalation-based transition metal oxides and conversion based sulfur and air, which are used in a LiM battery with a high energy density for future unmanned electric vehicles and power grid energy storage systems. In addition, the present disclosure will contribute to the development of a pilotless plane such as a drone, which has been newly emerged. Through the present disclosure, it is prospected that global competitiveness can be ensured in relevant secondary battery and electrochemical capacity industries.

In one general aspect of the present disclosure, there is provided a lithium metal anode, comprising: (a1) a lithium metal; and (a2) at least one artificial solid electrolyte interface (SEI) layer formed on the lithium metal.

According to another embodiment of the present disclosure, there is provided a lithium metal battery, comprising: (a) a lithium metal anode according to various embodiments of the present disclosure; (b) a cathode; and (c) an electrolyte located between the lithium metal anode and the cathode.

According to still another embodiment of the present disclosure, there is provided a preparation method of a lithium metal anode, comprising: (A) forming at least one Langmuir-Blodgett layer, defined as the artificial SEI layer, on a substrate by performing a process of moving the layer dispersed on a surface of a dispersion medium onto the substrate and drying the moved thin film layer at least once, and (B) transferring the at least one layer formed on the substrate onto a lithium metal.

During electrochemical cycling, the reactive and soft LiM tends to form dendrites due to unstable SEI and uneven distribution of the localized current densities throughout the surfaces induced by uneven deposition of Li. Once lithium nucleates, it starts to proliferate through the separator and internally short the circuit to generate heats that could potentially cause the battery to explode. Also, increasing the surface area over cycling causes electrolyte degradation and dead lithium (lowering coulombic efficiency) as a result of the continuous breakage/formation of the SEI layer. To prevent this undesirable problem, it is necessary to create stable, artificial SEI film and add various salt additives in the electrolyte that are known to be effective in protecting the LiM anode. Hence, various types of ultra-thin films consisting of graphene and ceramic are applied on the LiM surface to form a stable artificial SEI layer that suppresses the formation/proliferation of Li dendrites and side reactions.

BRIEF DESCRIPTION OF THE DRAWINGS

FIG. 4A shows a surface of a nitrogen-doped graphene oxide coated into three layers on an aluminum foil; FIG. 4B shows a surface of a nitrogen-doped graphene oxide coated into three layers on a lithium metal; FIG. 4C shows a surface of a nitrogen-doped graphene oxide coated into three layers on a lithium metal; and FIG. 4D shows an inclined state of a nitrogen-doped graphene oxide/lithium-terminated sulfonated titania nanopowder layer on a lithium metal. These show that the high quality artificial SEI films are prepared, and the complete transfer of the films are successfully done.

FIG. 5A shows a nitrogen-doped graphene oxide and FIG. 5B shows a lithium-terminated sulfonated titania nanopowder layer are coated. Systematic thickness increase of the artificial SEI films is observed with respect to the layer numbers.

DETAILED DESCRIPTION OF EMBODIMENTS

Hereinafter, various embodiments of the present disclosure will be described in detail.

An embodiment of the present disclosure provides a lithium metal anode including (a1) a lithium metal, and (a2) at least one Langmuir-Blodgett film as an artificial SEI layer formed on the lithium metal.

At this time, the at least one Langmuir-Blodgett film may be made of the same material or different materials and independently selected from the group consisting of graphene nanoparticle, nitrogen-doped graphene oxide, graphene oxide, lithium-terminated sulfonated titania nanopowder, reduced graphene oxide, graphene powder, crumpled graphene oxide, crumpled reduced graphene oxide, crumpled reduced graphene oxide with titania nanoparticle, titania nanopowder, and mixtures thereof.

Among them, graphene nanoparticle, nitrogen-doped graphene oxide, graphene oxide, and lithium-terminated sulfonated titania nanopowder are desirable due to excellent lithium ion conductivity, and among them, graphene nanoparticle is particularly desirable in view of the improvement of lithium ion conductivity.

As described above, if the Langmuir-Blodgett artificial SEI layer configures multi layers, the multi layers may be made of the same material or made of at least two different materials. In other words, if the layer is composed of multilayered films, two layers adjacent to each other may be made of the same material or different materials.

At this time, if the Langmuir-Blodgett artificial SEI layer configures multilayered films, the multilayered films may be, for example, a composite layer of a nitrogen-doped graphene oxide layer and a lithium-terminated sulfonated titania nanoparticle layer, prepared in the examples below, without being limited thereto.

In another embodiment, the Langmuir-Blodgett artificial SEI layer has an entire thickness of 20 nm to 5 μm.

According to another embodiment, the at least one Langmuir-Blodgett artificial SEI layer is any one selected from the group consisting of graphene oxide with a thickness of 20 nm to 200 nm, nitrogen-doped graphene oxide with a thickness of 20 nm to 200 nm, and lithium-terminated sulfonated titania nanopowder with a thickness of 300 nm to 3000 nm.

Figure 1A:
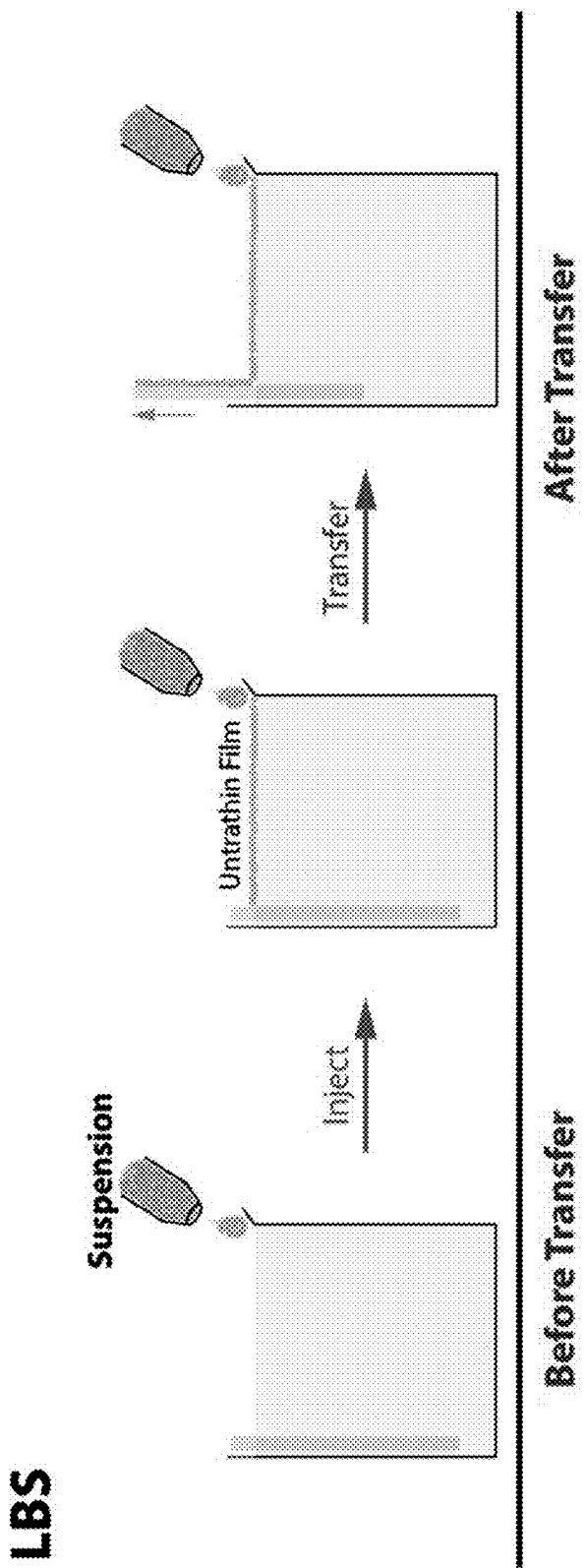
FIGS. 1A and 1B shows a preparation process of an ultra-thin artificial SEI film and a transfer process, respectively. A film of the ultra-thin film formed on water surface is attached on a solid and then transferred to a lithium metal using a roll-press.
Figure 1B:
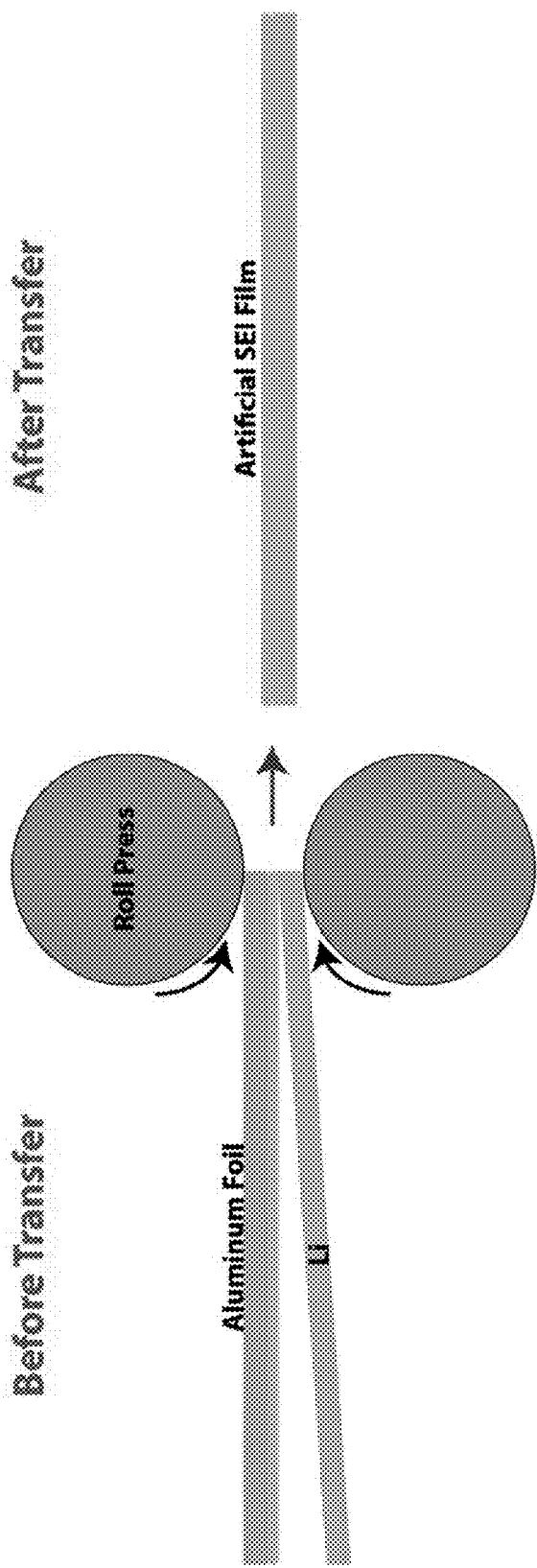
Figure 2:
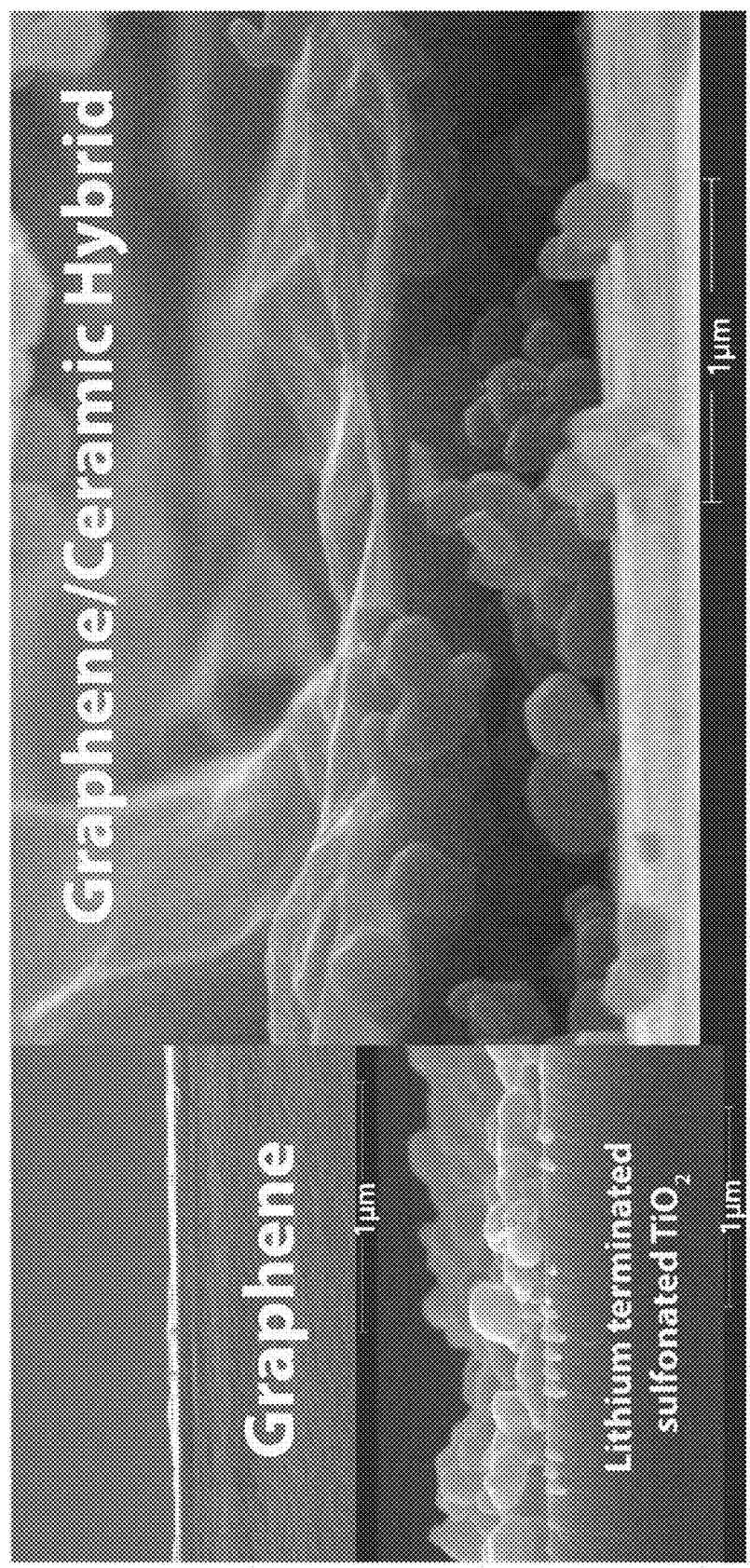
FIG. 2 is a cross-sectional SEM image of single coating layer of nitrogen-doped graphene oxide (a left upper portion) and a lithium-terminated sulfonated titania nanoparticle single layer (a left lower portion) on a glass slide, and a section of bicomponent multilayer of the graphene and functionalized titania nanoparticles (a right portion) on the slide glass, prepared in the present disclosure. The single coating layer thickness of nitrogen-doped graphene oxide, lithium terminated sulfonated titania nanoparticle, and bicomponent multilayer of the graphene and functionalized titania nanoparticles are ~20 nm, ~300 nm, and ~650 nm, respectively.
Figure 3:
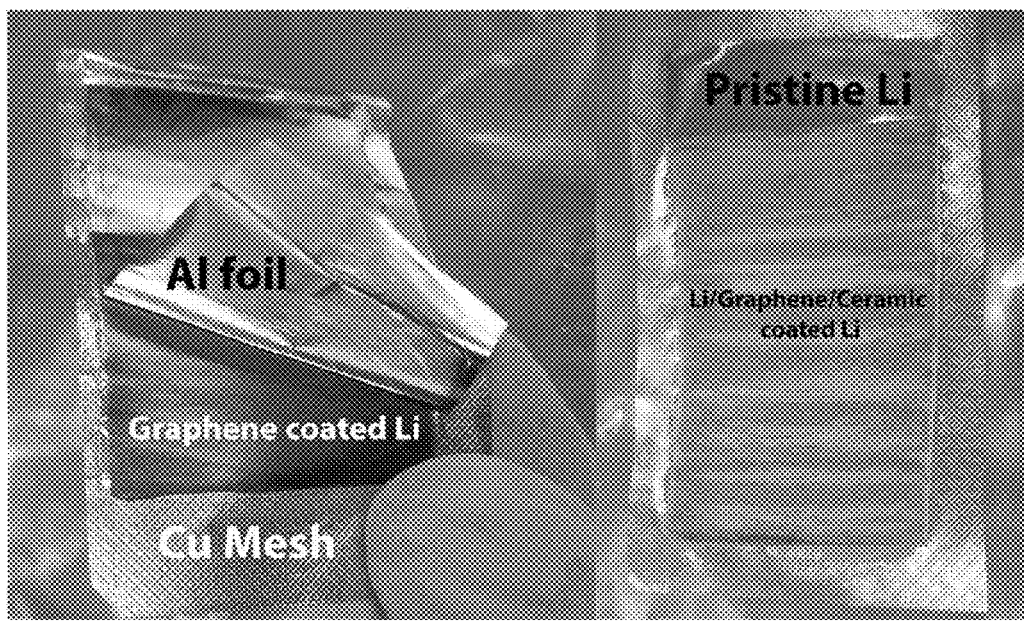
FIG. 3 is a photograph showing a graphene-coated lithium metal transferred by a rolling press (a left portion) and a functional titania thin film/graphene/lithium metal (a right portion). These images are shown to demonstrate protected lithium metals with artificial SEI films which are graphene and graphene/functionalized ceramic hybrid.
Figure 4A:
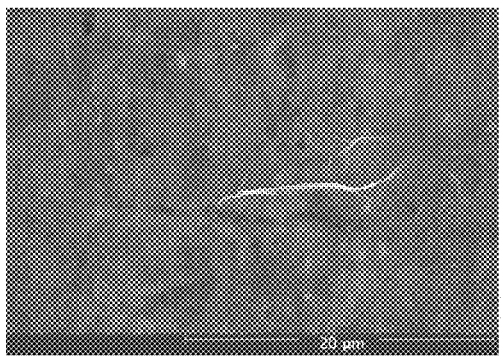
FIGS. 4A to 4D are SEM images showing an artificial SEI layer coated to a lithium metal according to the present disclosure.
Figure 4B:
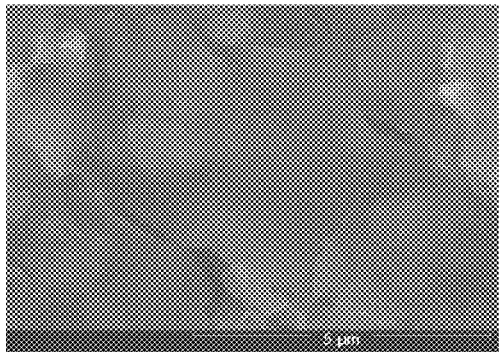
Figure 4C:
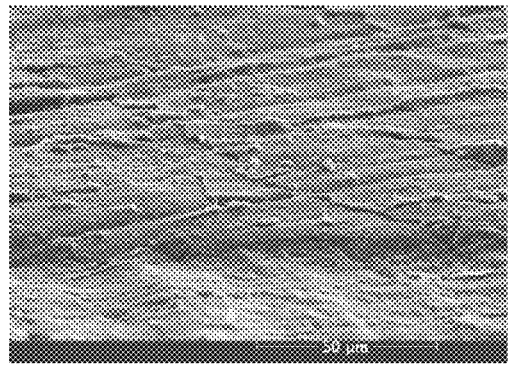
Figure 4D:
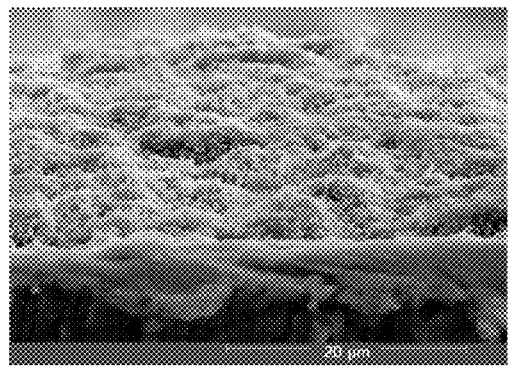
Figure 5A:
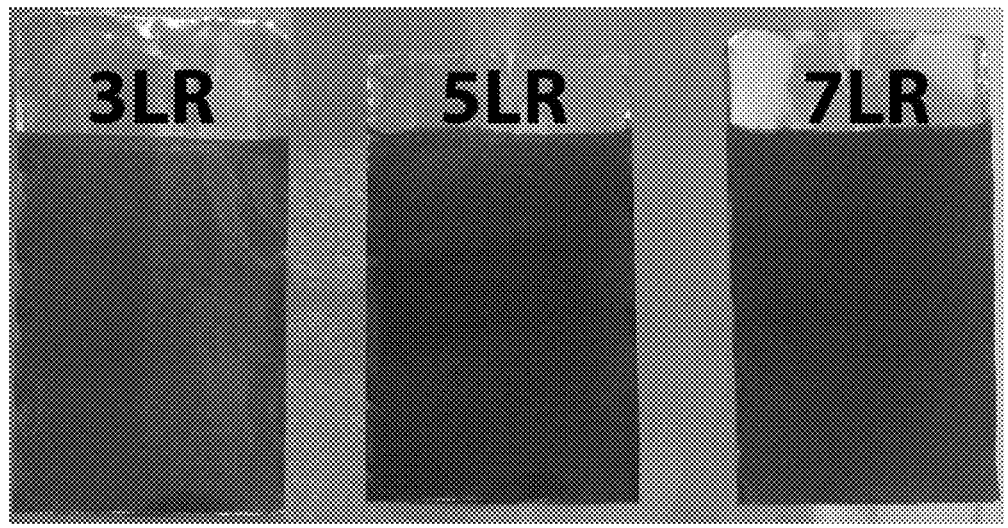
FIGS. 5A and 5B are microscope photographs showing a coated layer formed on a commercial aluminum foil, composed of 3 to 7 layers made of different materials. Here.
Figure 5B:
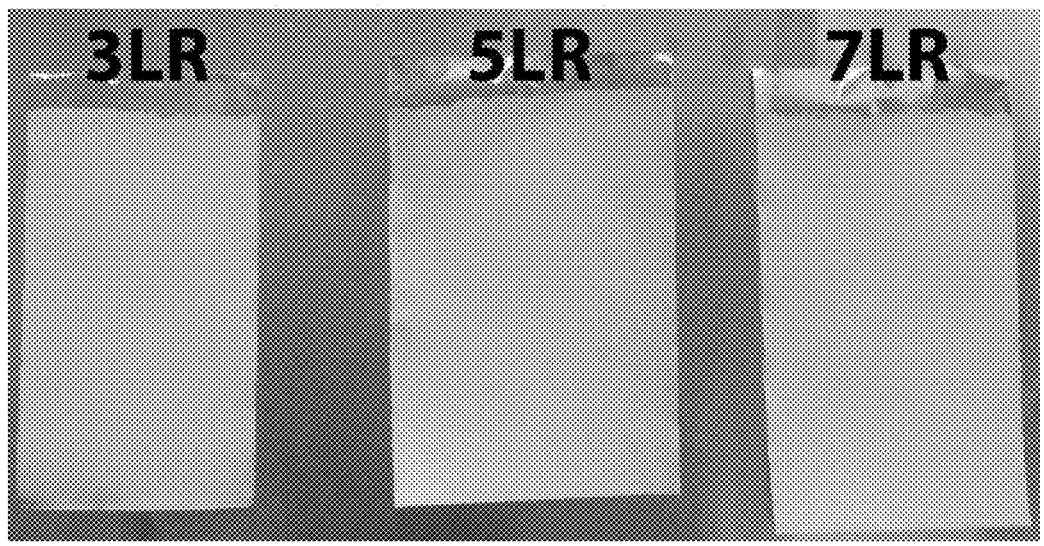
Figure 6:
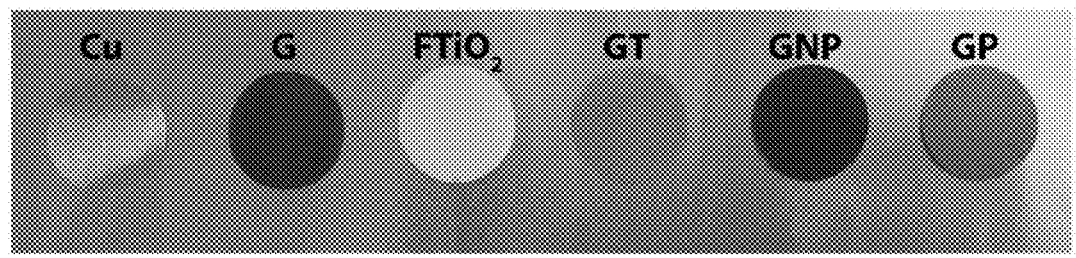
FIG. 6 is a photograph showing an uncoated copper foil (Cu), a nitrogen-doped graphene oxide (G) coated copper foil, a lithium-terminated sulfonated titania nanopowder (FTiO$_2$) coated copper foil, a nitrogen-doped graphene oxide/lithium-terminated sulfonated titania nanopowder (GT) coated copper foil, a graphene nanoparticle (GNP) coated copper foil, and a graphene powder (GP) coated copper foil. These modified Cu disks are paired with the modified LiM to analyze coulombic efficiency of Li deposition/dissolution at the current density and capacity of 1 mA cm$^{-2}$ and 1 mAh cm$^{-2}$.
Figure 7:
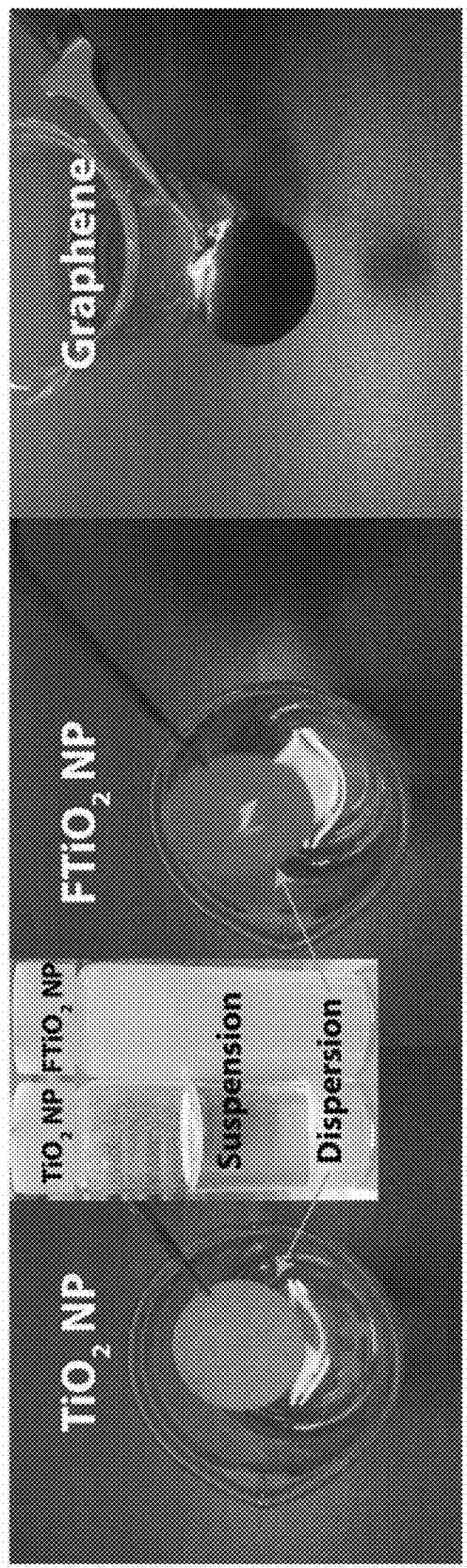
FIG. 7 shows a hydrophilic property of the nanomaterial coating according to the present disclosure, including an original titania nanopowder (a left portion) coated on an aluminum foil, a functional titania nanopowder (a center portion), and a nitrogen-doped graphene oxide coated layer (a right portion), which are well wet in a distilled water and thus contrasted with a hydrophobic property and suspension instability of titania nano-powder.
Figure 8:
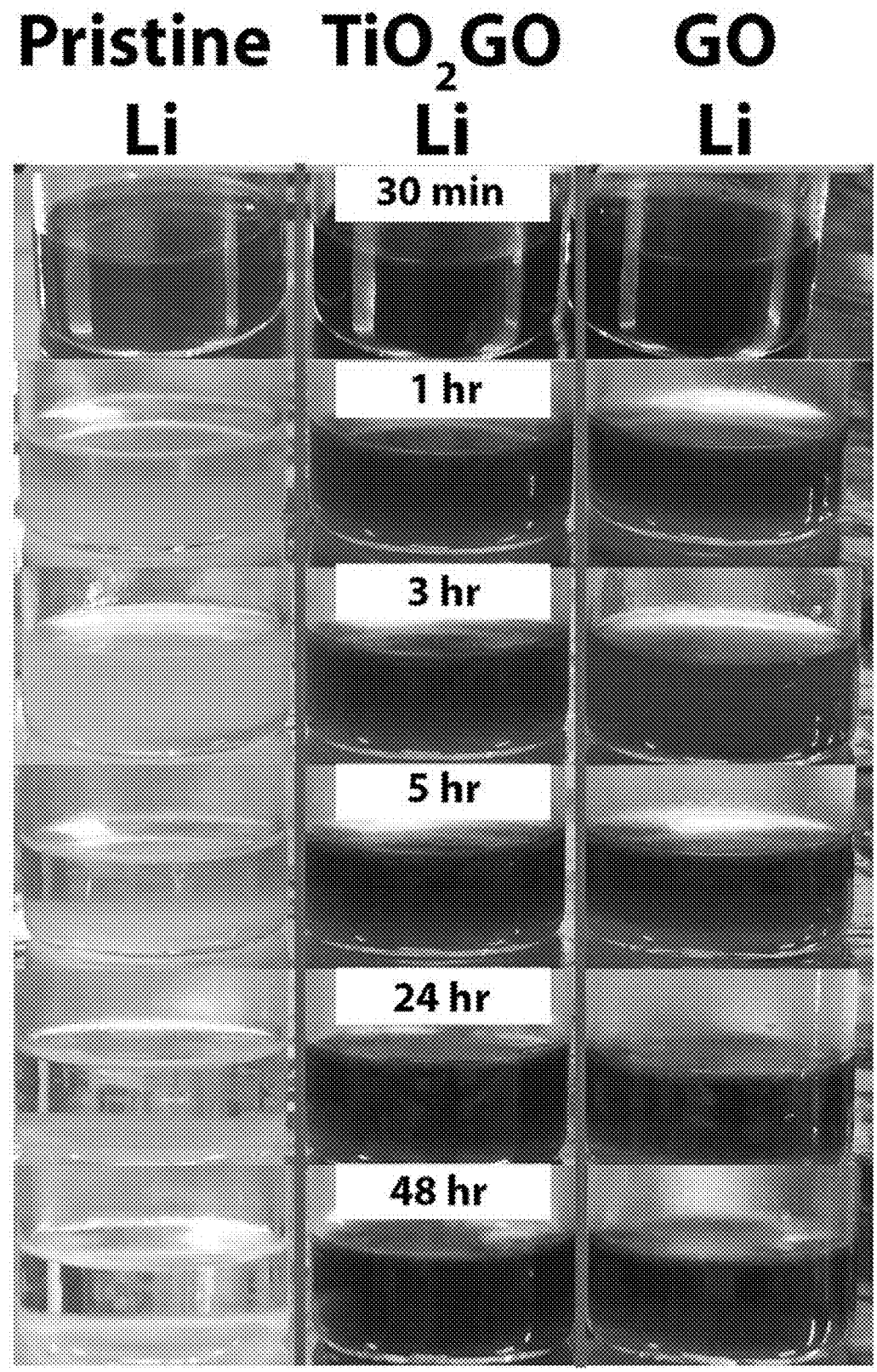
FIG. 8 shows reactivity of lithium polysulfide (0.5 M Li$_2$S$_6$ in dimethoxyethane:dioxolane, 1:1) in the present disclosure, depicting a lithium metal (a left portion), a nitrogen-doped graphene oxide/lithium-terminated sulfonated titania nano-powder (a center portion), and a nitrogen-doped graphene oxide (a right portion). Here, polysulfide by the coated layer is maintained in a best way in the center photograph. This demonstrates the chemical protection of the protected lithium from lithium polysulfides which spontaneously react with LiM. Hence, color change indicates the presence of the spontaneous reaction between the LiM and lithium polysulfides.
Figure 9:
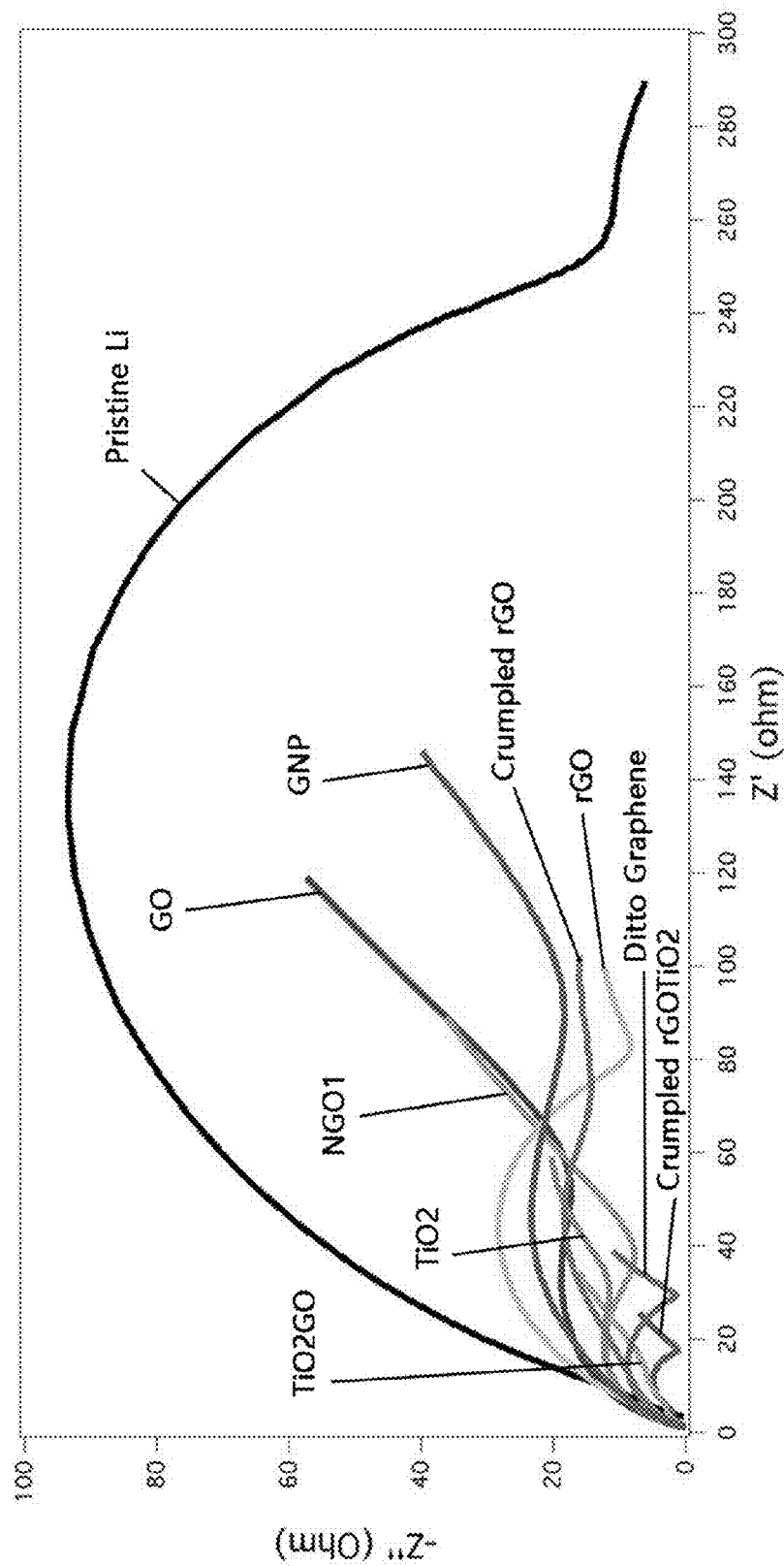
FIG. 9 shows measurement results of AC impedance of a symmetric cell whose one electrode is made of lithium metal and the other electrode is made of lithium metal and lithium having a coating film according to the present disclosure, and exhibits that the impedance resistance decreases in all modified LiM anodes, namely a graphene nanoparticle (GNP), a graphene oxide (GO), a nitrogen-doped graphene oxide (NGO), a nitrogen-doped graphene oxide/lithium-terminated sulfonated titania nanopowder (TiO$_2$GO), a lithium-terminated sulfonated titania nanopowder (TiO$_2$), a graphene powder (Ditto Graphene), a reduced graphene oxide (rGO), a crumpled reduced graphene oxide (Crumpled rGO) and a titania nanoparticle-contained crumpled graphene oxide (Crumpled rGOTiO$_2$). Impedance measurements are done with various artificial SEI films. Decrease of interfacial impedance is observed for all the modified LiM anode samples.
Figure 10A:
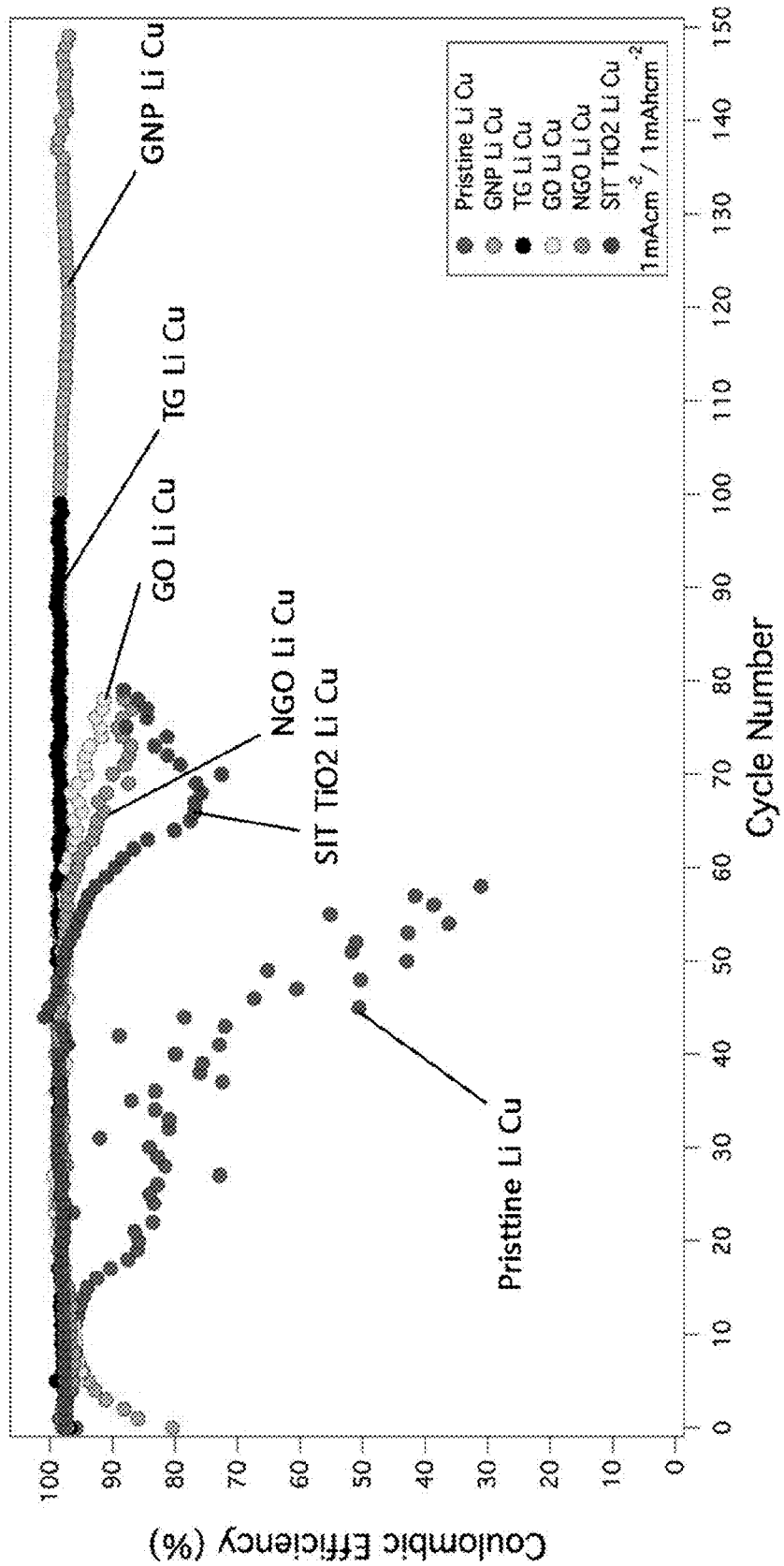
FIGS. 10A and 10B show Coulomb efficiency of a symmetric cell having a coated layer according to the present disclosure, wherein FIG. 10A 1 M LiTFSI 0.1 M LiNO$_3$ DME:DOL (1:1 v:v) is used as an electrolyte for untreated Li metal and pure Cu (Pristine Li Cu), graphene nanoparticle coated lithium and pure copper (GNP Li Cu), nitrogen-doped graphene oxide/lithium-terminated sulfonated titania nanopowder coated lithium and pure copper (TG Li Cu), graphene oxide coated lithium and pure copper (GO Li Cu), nitrogen-doped graphene oxide coated lithium and pure copper (NGO Li Cu), and lithium-terminated sulfonated titania nanopowder coated lithium and pure copper (SIT TiO$_2$ Li Cu), and in FIG. 10B 1 M LiTFSI 0.1 M LiNO$_3$ 0.05 M CsNO$_3$ DME:DOL (1:1 v:v) is used as an electrolytic solution for untreated Li metal and pure Cu (Pristine Li Cu), nitrogen-doped graphene oxide/lithium-terminated sulfonated titania nanopowder coated lithium and pure copper (TGLiCu), and graphene powder coated Li and Cu (Ditto GLiCu). Li deposition/dissolution efficiencies are measured on various artificial SEI film coated LiM and Cu disks with two different electrolyte systems as mentioned above. The efficiencies are obtained by plating and stripping 1 mAh cm$^{-2}$ amount of lithium onto the modified Cu substrate. Stable and high coulombic efficiencies are obtained.
Figure 10B:
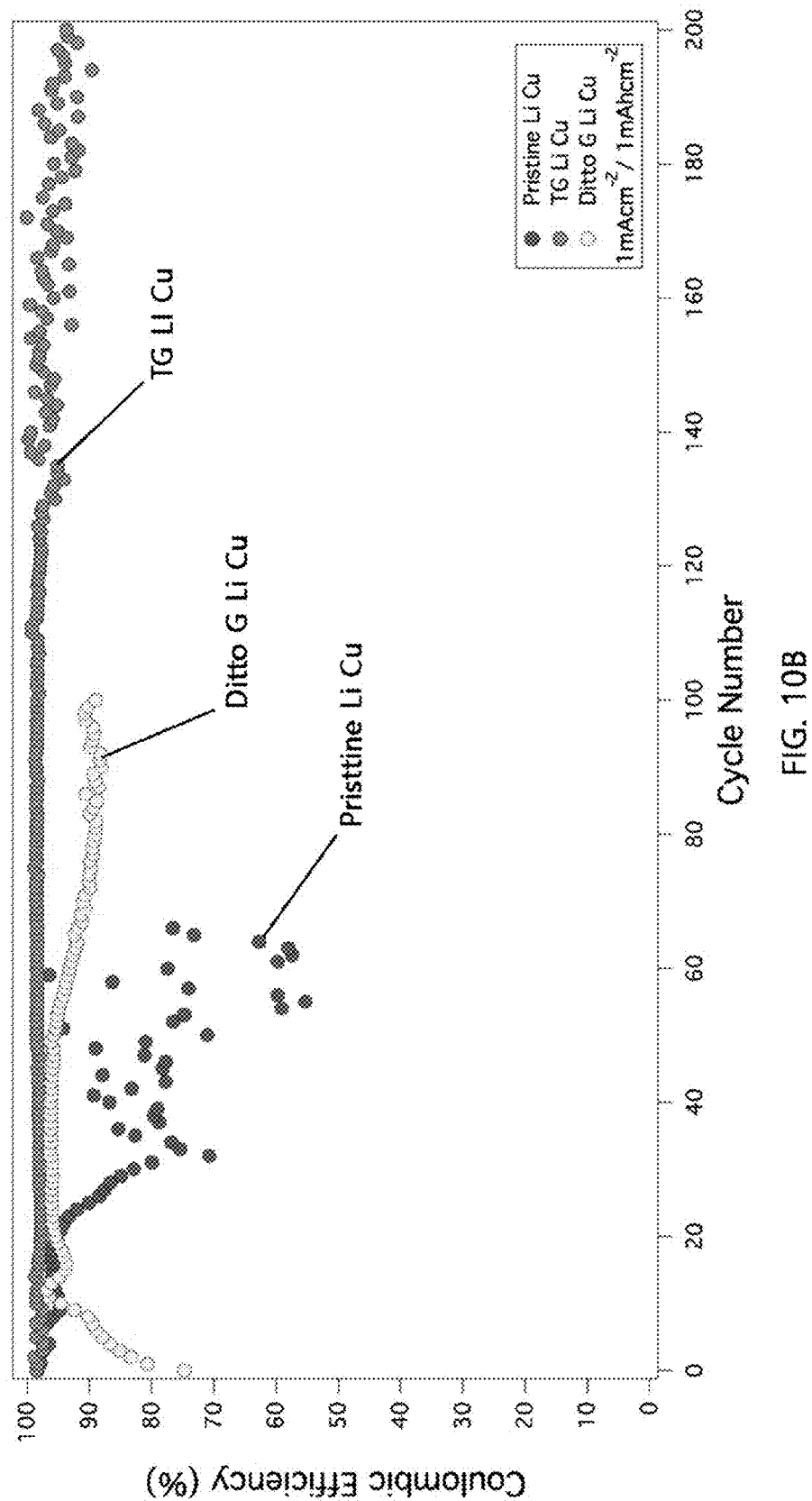
Figure 11A:
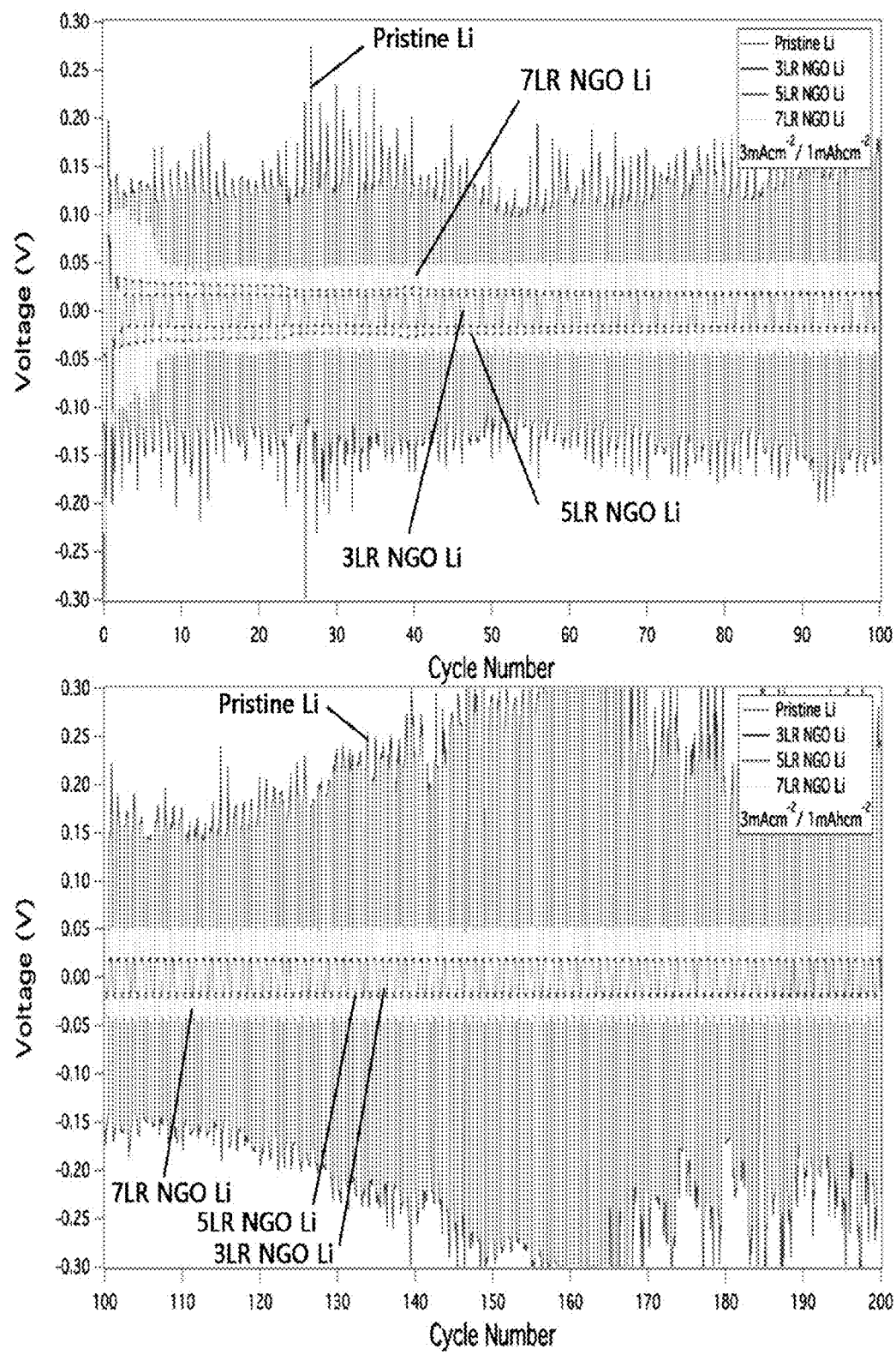
FIGS. 11A and 11B show Coulomb efficiency till 200 cycles of a cell in which a lithium metal anode and an anode modified with (a) nitrogen-doped graphene oxide and (b) lithium-terminated sulfonated titania nanopowder in 3 to 5 layers are used as a counterpart of copper, obtained with a current density of 3 mAcm$^{-2}$ and an electric capacity of 1 mAhcm$^{-2}$ (1MLiPF$_6$ 2 wt % VC EC:DMC (1:1 v:v) electrolyte). Stable electrochemical cyclabilities are achieved in terms of spike-less and low overpotential voltage profiles compared with that of pristine Li metal. All the modified LiM samples exhibit stable deposition/dissolution of Li, and slight increase of overpotential is observed with respect to the increase in coating layer number.
Figure 11B:
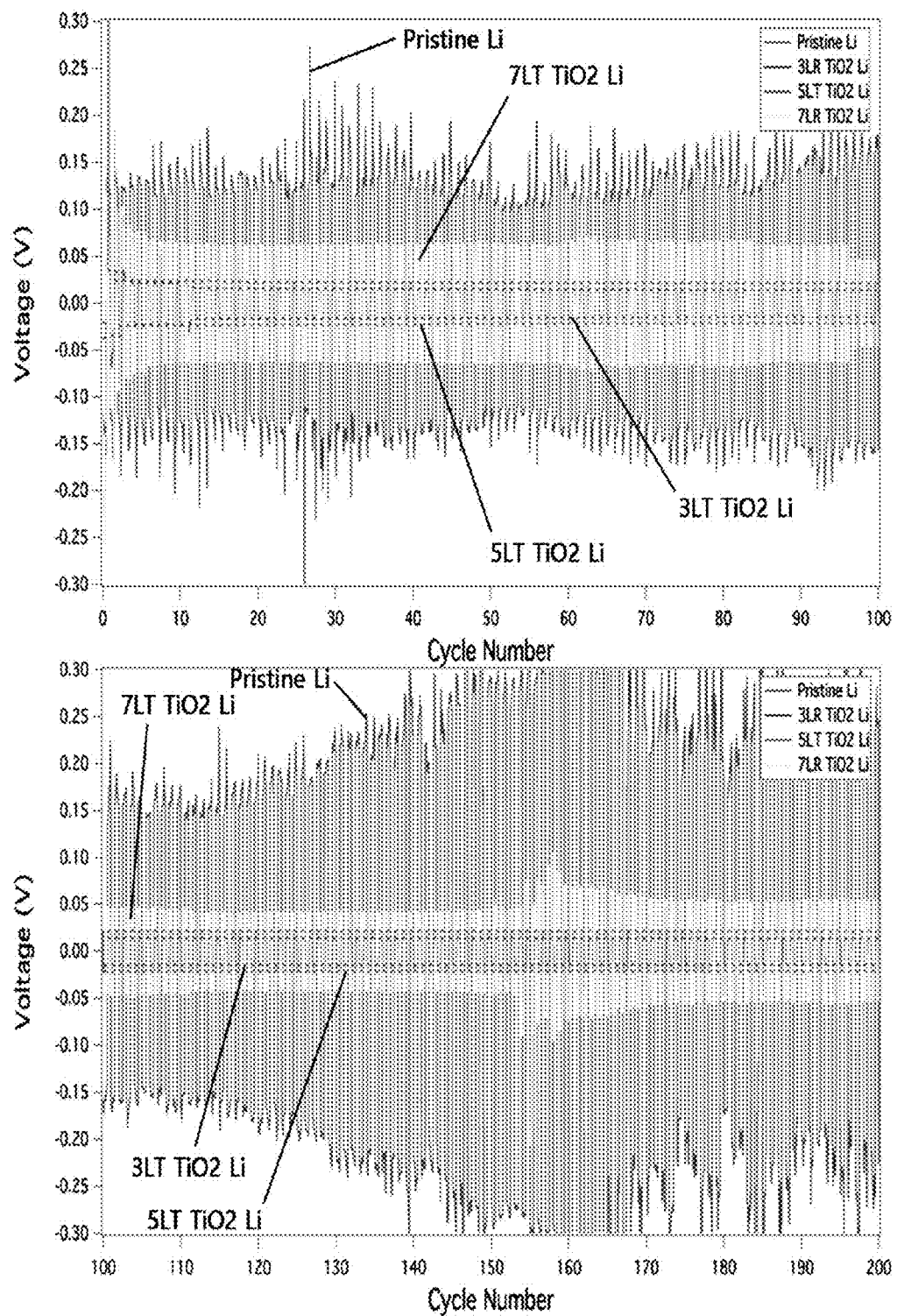
Figure 12:
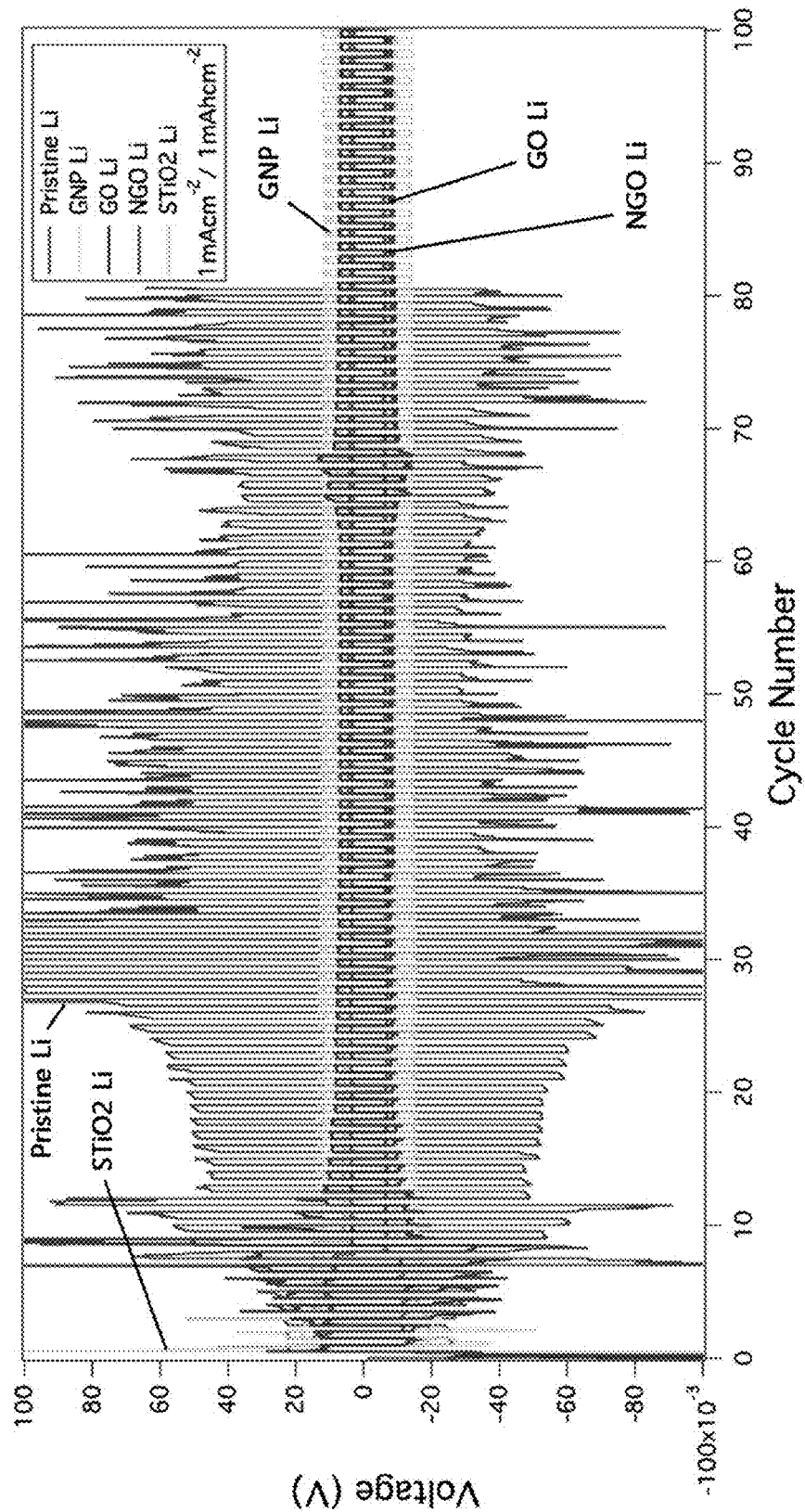
FIG. 12 shows the change of overvoltage till 100 cycles of a cell in which a lithium metal anode and an anode of graphene nanoparticle (GNP), graphene oxide (GO), nitrogen-doped graphene oxide and lithium-terminated sulfonated titania nanopowder are used as a counterpart of copper, obtained with a current density of 1 mAcm$^{-2}$ and an electric capacity of 1 mAhcm$^{-2}$ (1M LiPF$_6$ 2 wt % VC EC:DMC (1:1 v:v) electrolyte). Stable electrochemical cyclabilities are achieved by forming various stable artificial SEI layers on LiM.
Figure 13:
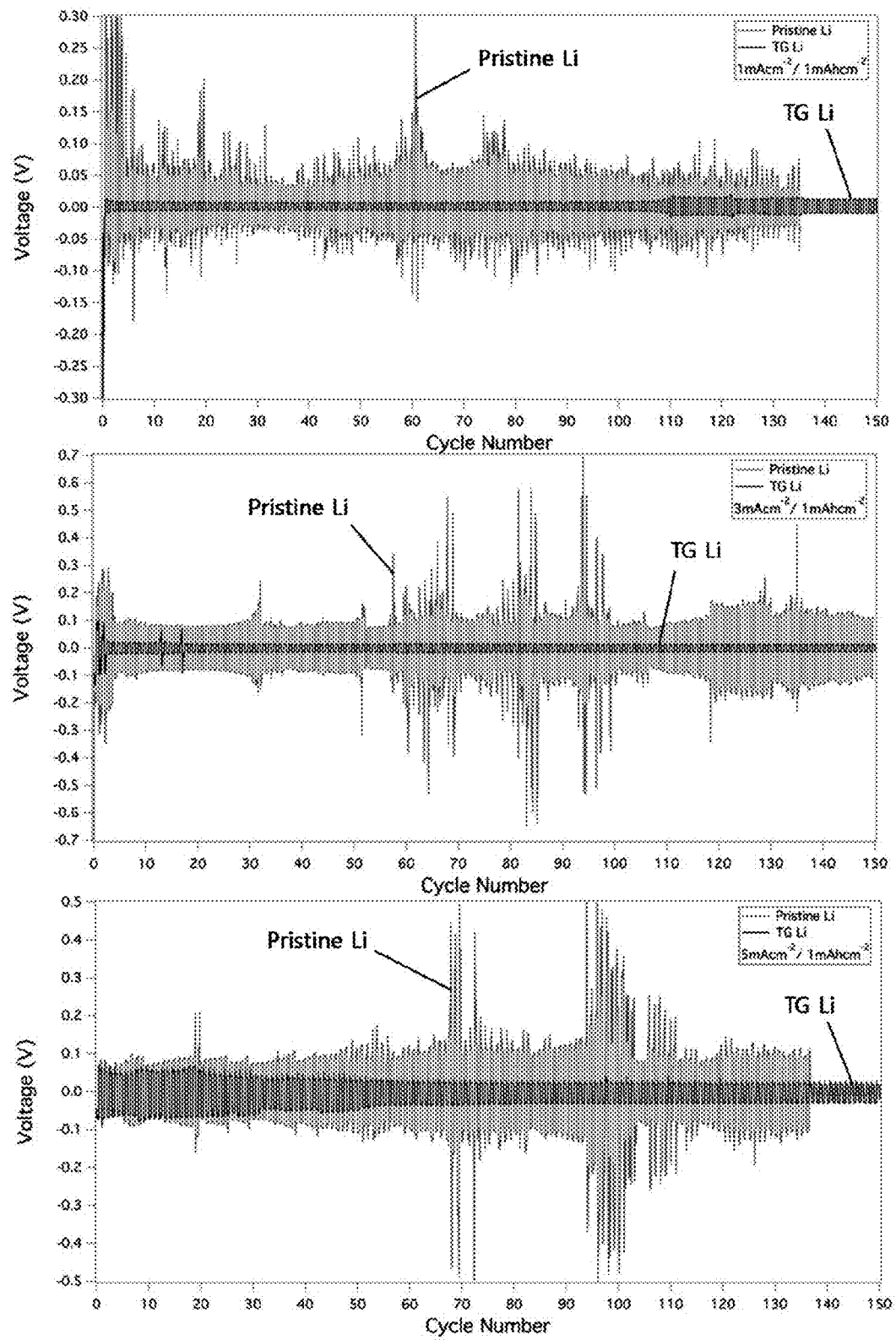
FIG. 13 shows the change of overvoltage till 150 cycles of a cell in which a lithium metal anode and an anode of graphene nanoparticle (GNP), graphene oxide (GO), nitrogen-doped graphene oxide and lithium-terminated sulfonated titania nanopowder are used as a counterpart of copper, obtained with a current density of 1, 3, 5 mAcm$^{-2}$ and an electric capacity of 1 mAhcm$^{-2}$ (1M LiPF$_6$ 2 wt % VC EC:DMC (1:1 v:v) electrolyte). This demonstrates that the artificial SEI layer on the lithium is capable of high current density in carbonate-based electrolyte.
Figure 14:
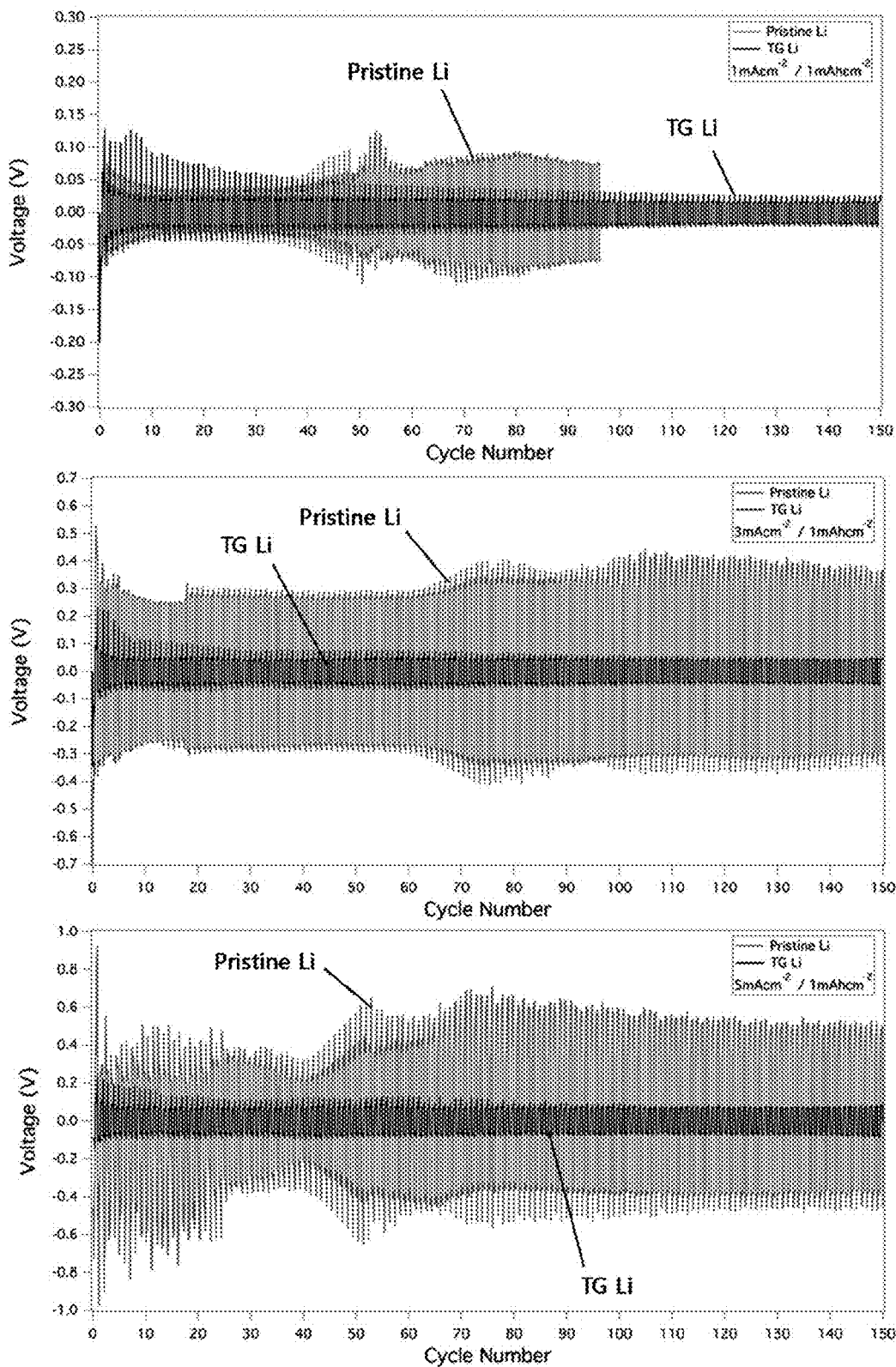
FIG. 14 shows the change of overvoltage till 150 cycles of a cell in which a lithium metal anode and an anode of graphene nanoparticle (GNP), graphene oxide (GO), nitrogen-doped graphene oxide and lithium-terminated sulfonated titania nanopowder are used as a counterpart of copper, obtained with a current density of 1, 3, 5 mAcm$^{-2}$ and an electric capacity of 1 mAhcm$^{-2}$ (1M LiTFSI 0.1 M LiNO$_3$, 0.05 M CsNO$_3$ DME:DOL (1:1 v:v) electrolyte). This confirms that the artificial SEI layer on the lithium is capable of high current density in ether-based electrolyte.
Figure 15:
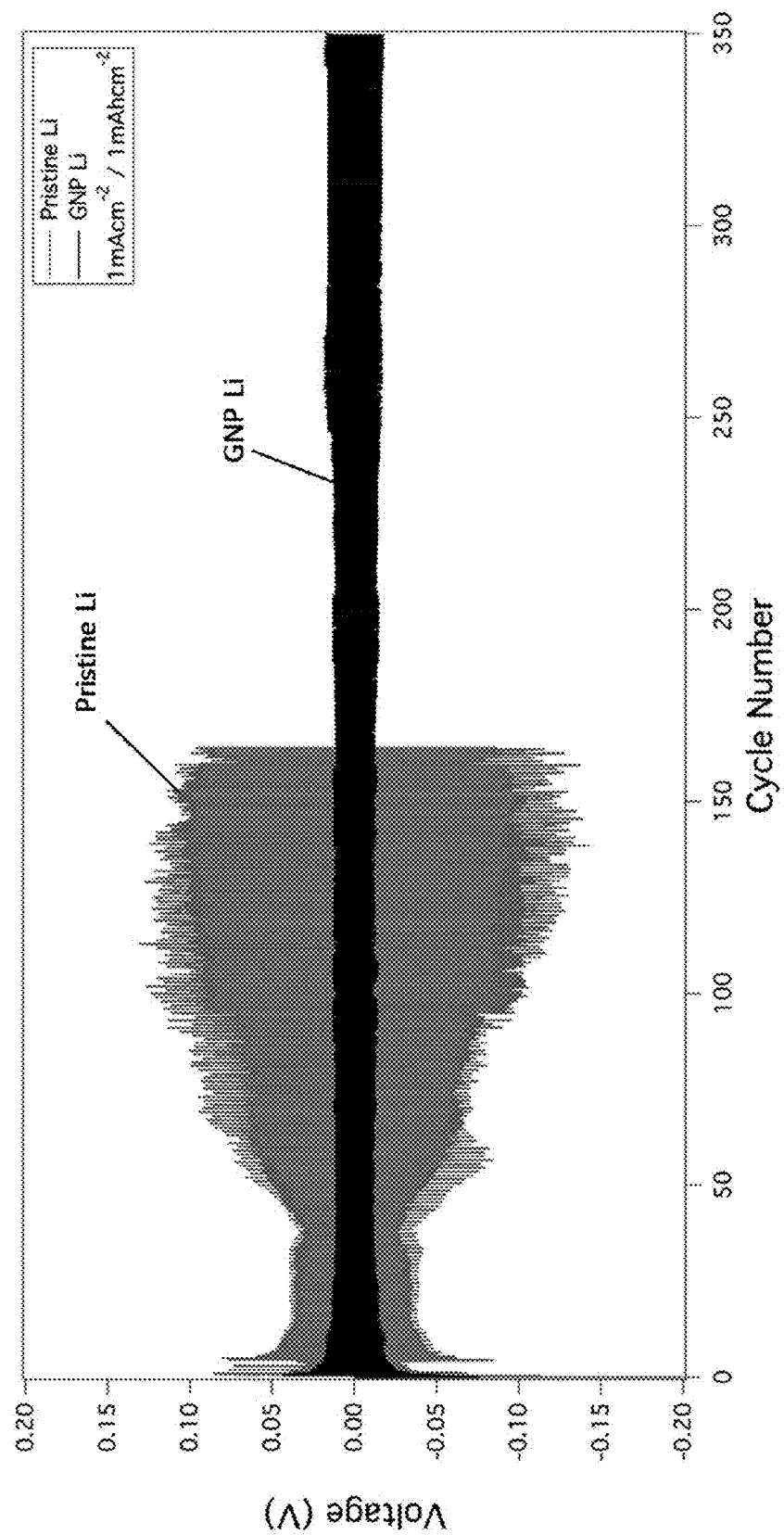
FIG. 15 shows the change of overvoltage till 350 cycles of a cell in which a lithium metal anode and a lithium anode coated with graphene nanoparticle (GNP) are used as a counterpart of copper, obtained with a current density of 1 mAcm$^{-2}$ and an electric capacity of 1 mAhcm$^{-2}$ (1M LiTFSI 0.1 M LiNO$_3$, 0.05 M CsNO$_3$ DME:DOL (1:1 v:v) electrolyte). In the ether-based electrolytic solution, the lithium anode having a GNP artificial SEI layer exhibits high stability.
Figure 16:
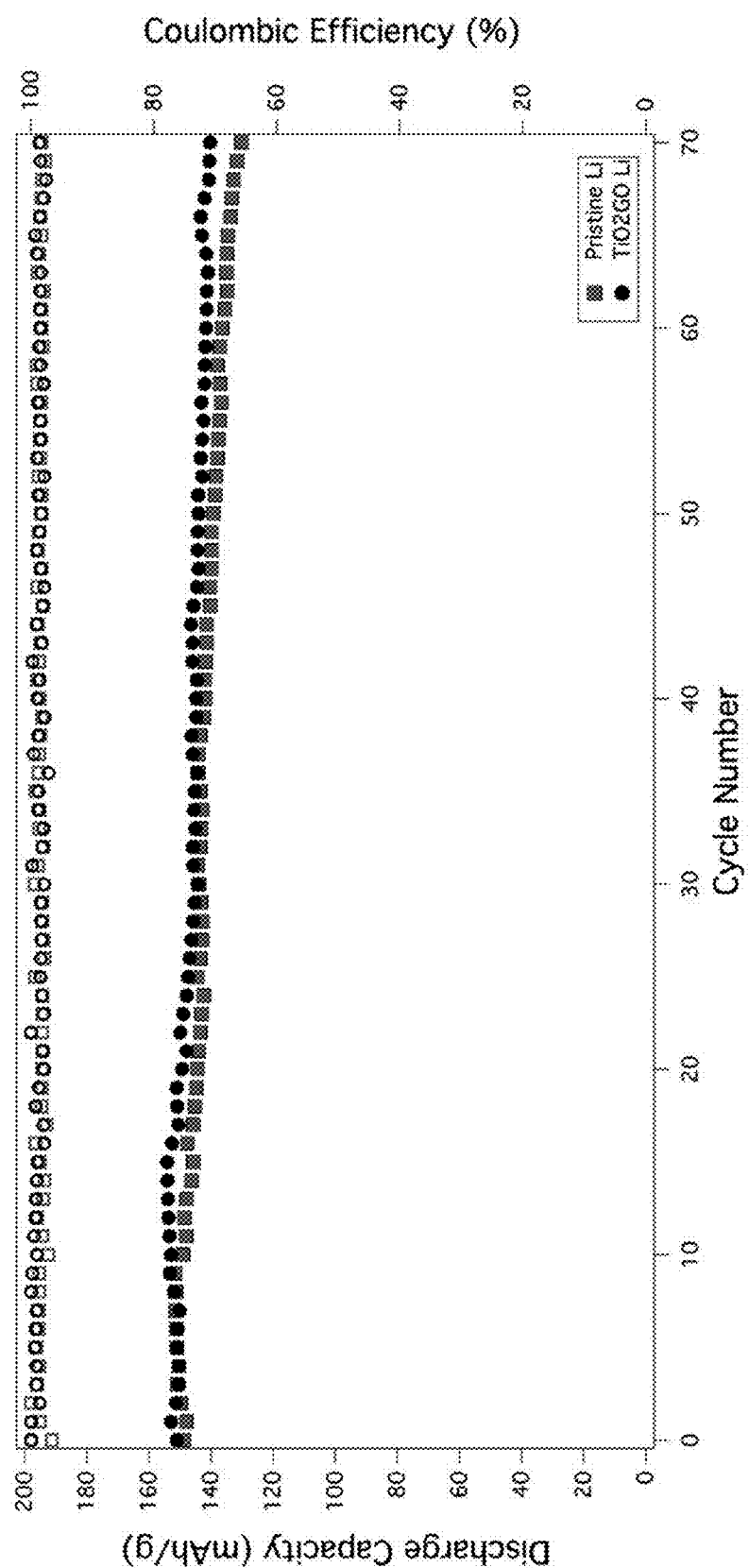
FIG. 16 shows Li cycle characteristics of a commercial NCM cathode, an untreated lithium metal, and a lithium metal (TiO$_2$GO Li) coated with nitrogen-doped graphene oxide/lithium-terminated sulfonated titania nanopowder under the condition of 1 C, 1M LiPF$_6$ EC:EMC (1:1 v:v) electrolyte. This demonstrate that the modified Li with stable artificial SEI film is electrochemically stable and compatible with intercalation-based cathode in carbonate-based electrolyte.
Figure 17:
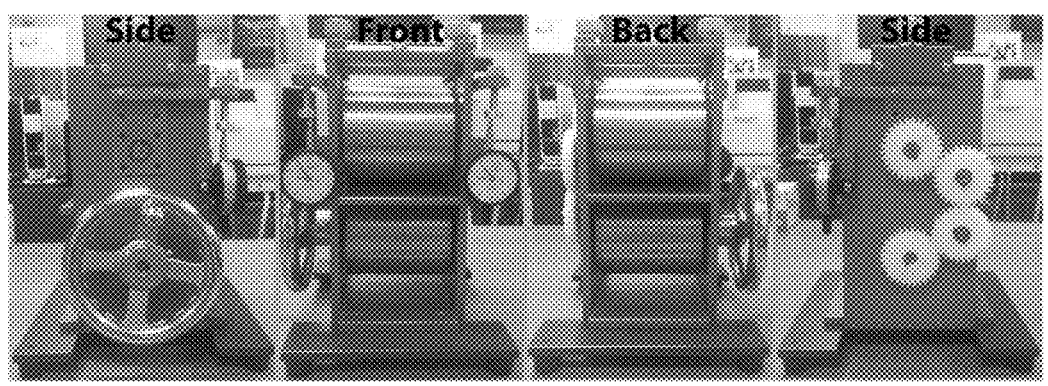
FIG. 17 shows a rolling press designed and used for the experiment of the present disclosure.

If the thickness is smaller than the above range, after the Langmuir-Blodgett artificial SEI layer is formed, the thin film layer may be destroyed during a transfer process. If the thickness is greater than the above range, resistance may increase so great not to endure a high current density during the lithium electroplating and dissolving processes (see FIG. 11).

According to another embodiment, the nanoparticle includes metal oxide selected from the group consisting of alumina, silica, zirconia, ceria, yttria and mixtures thereof. In the following embodiment, titania nanopowder is used, but other nanoparticles as above may also be used.

Another embodiment of the present disclosure provides a lithium metal battery, including (a) a lithium metal anode according to various embodiments of the present disclosure; (b) a cathode; and (c) an electrolyte located between the lithium metal anode and the cathode.

At this time, the lithium metal battery may be a lithium metal primary battery or a lithium metal secondary battery.

Still another embodiment of the present disclosure provides a preparation method of a composite layer, which includes (A) forming at least one Langmuir-Blodgett artificial SEI layer on a substrate by performing a process of moving a Langmuir-Blodgett artificial SEI layer dispersed on a surface of a dispersion medium onto the substrate and drying the moved thin film layer at least once, and (B)

transferring the at least one Langmuir-Blodgett artificial SEI layer formed on the substrate onto an alkali metal.

The alkali metal may be, for example, a lithium metal, without being limited thereto. However, when the lithium metal is used, the prepared composite layer may be utilized as a lithium metal anode.

In an embodiment, in the step (A), the Langmuir-Blodgett artificial SEI layer may be moved by lifting up the substrate immersed in the dispersion medium so that the Langmuir-Blodgett layer covers the substrate.

In addition, in the step (A), when the substrate is lifted up, a suspension made of the same material as the Langmuir-Blodgett artificial SEI layer may be simultaneously put into the dispersion medium.

According to another embodiment, the step (A) is performed when the Langmuir-Blodgett artificial SEI layer occupies 30% to 90% of the surface of the dispersion medium. If the occupied surface is smaller than 30%, the Langmuir-Blodgett artificial SEI layer may not be agreeably coated on a solid surface. If the occupied surface is greater than 90%, the Langmuir-Blodgett artificial SEI layer may not be formed regularly.

According to another embodiment, the suspension has a concentration of 0.5 to 5 wt %.

According to another embodiment, the suspension is put so that an area ratio of the surface of the dispersion medium, occupied by the Langmuir-Blodgett artificial SEI layer, is maintained to be 30% to 90% in comparison to an initial area. If the area ratio is smaller than 30%, the Langmuir-Blodgett artificial SEI layer may not be agreeably coated on a solid surface. If the area ratio is greater than 90%, the Langmuir-Blodgett artificial SEI layer may not be formed regularly.

According to another embodiment, the dispersion medium is water, and a suspension medium of the suspension is ethanol. Preferably, the dispersion medium is a polar or non-polar liquid, particularly water, in view of safety and economic feasibility. Also, the suspension medium is ethanol in view of safety and economic feasibility.

According to another embodiment, the step (B) is performed by means of roll pressing.

According to another embodiment, the step (B) is performed by pressing the lithium metal and the substrate to be closely adhered to each other so that the lithium metal and the Langmuir-Blodgett artificial SEI layer become adjacent to each other.

According to another embodiment, the pressing is performed by moving the lithium metal and the substrate, closely adhered to each other, through a rolling press in a state where protection films are placed at front and rear portions thereof.

According to another embodiment, an interval of pressing cylinders of the rolling press is adjusted to be 50% to 90% of an entire thickness put between press rolls, and a roll rotation speed is maintained to be 0.1 cm/sec to 1 cm/sec.

According to another embodiment, the step (B) further includes removing the substrate from the lithium metal to which the Langmuir-Blodgett layer artificial SEI is transferred.

According to another embodiment, the step (B) is performed under a dry environment with a relative humidity of 0% to 1%. If the relative humidity is higher than this rage, the lithium metal may be oxidized to deteriorate electrochemical characteristics.

According to another embodiment, the substrate is an aluminum foil, and the protection film is a polycarbonate film.

Hereinafter, some features and embodiments of the present disclosure will be described. However, the scope and content of the present disclosure should not be limited thereto.

Some embodiments of the present disclosure are directed to a method for forming a coated layer made of uniform nanomaterial, which is an ultra-thin film ensuring easy fabrication and good economic feasibility, and by using this, nanomaterial layers having different electrochemical characteristics and functions are prepared alternately on a conductive or non-conductive solid substrate in a layer-by-layer (LBL) way. In addition, the embodiments are directed to easily transporting the thin films to a surface of various solids such as a lithium metal (LiM) by using a rolling press or the like. In this process, an effective protection film in form of an ultra-thin film, which is so-called artificial solid-electrolyte interface (SEI) capable of suppressing the generation, dispersion and side reaction of lithium dendrite according to electrochemical cycles, inevitably occurring when LiM is used as a battery anode, may be prepared.

In other words, by using the instant self-assembling phenomenon of nanomaterial, exhibited by a Marangoni stress, a mixture of solvents with different surface tensions on a water surface is self-assembled to form a regularly arranged transportable single-particle film on a surface of various solid materials. If this technique of the present disclosure is used, a binder is not necessary, and thus there is no weight increase caused by a coated layer or no addition of impurities, thereby allowing precise control of thickness and cleanliness. In addition, by means of peculiar flexibility and stickiness of lithium metal of the ultra-thin film generated on a solid stable against water, the film may be easily moved to a lithium surface by means of a rolling press by applying a pressure between the LiM and the surface of the solid coated with the ultra-thin film. The process of the present disclosure is simple, continuous, inexpensive and safe, and thus the process of the present disclosure has great industrial applicability.

The ultra-thin film of graphene or the like formed on the LiM according to the present disclosure may be applied as a most preferred artificial SEI layer for rapid dispersion of lithium ions. Lithium ions may move three-dimensionally at the graphene, and the electrolytic solution and the anode are effectively separated to suppress side reaction and formation of lithium dendrite. In addition, high elasticity (0.5 T Pa) of the graphene may prevent perforation of lithium. The graphene protection film may be formed by means of dip coating, spray coating, spin coating, inkjet coating, doctor blading, electroplating, vacuum filtration, drop casting, interface deposition, Langmuir-Blodgett, and LBL. Among a lot of methods, there is not found any method capable of forming a high-quality ultra-thin film graphene in a rapid and easy way while effectively controlling its thickness. In addition, even though nano-ceramic material having high elasticity and thermal conductivity is known in the art as a protection material suitable for lithium dendrite and a separator, it is difficult to make a LiM anode with an high output due to a high interface impedance caused by the ceramic coating on the anode. In order to overcome this, the lithium-terminated sulfonated ceramic ultra-thin film may be easily composed, and thus the corresponding problem may be solved. By forming the functional thin film, a LiM anode having low impedance resistance and allowing more stable lithium plating/dissolution may be obtained. Resultantly, by forming the functional ceramic thin film simultaneously applied with the graphene ultra-thin film, a multi-functional artificial SEI film may be formed. Also, by transferring this thin film to a surface of a lithium metal, a stable and safe LiM anode for a LiM battery may be manufactured.

The present disclosure relates to a method for forming an artificial SEI layer of an ultra-thin film, composed of graphene and functionalized ceramic, on a LiM, and more particularly, to an anode of a secondary battery which uses inserted and switched cathodes in order to improve Coulomb efficiency and plating/dissolution stability of lithium at the LiM. For optimizing a coating thickness and a loading density of the anode protection layer, a test was performed while changing the thickness in the range of 20 nm to 3 μm. Here, a high-quality nanomaterial layer with a predetermined thickness may be rapidly formed on a solid surface by means of self-assembling on water. This rapid and inexpensive coating process requiring only water and ethanol has great industrial applicability. Also, since a binder is not present, there is no weight increase and no addition of impurities caused by the formation of a coated layer, thereby reducing side reactions generated during an electrochemical reaction. According to the process of the present disclosure, various ultra-thin films (graphene oxide, nitrogen-doped graphene oxide, reduced graphene oxide, crumpled reduced graphene oxide, graphene nanoparticle, titania nanoparticle, lithium-terminated sulfonated titania nanopowder and combinations thereof) may be easily manufactured in the air and easily transported to the LiM by using a rolling press.

At the electrochemical cycles, the active and soft LiM tends to form dendrite during a charge process due to the difference in local current densities. Once lithium is generated on the surface, the lithium may penetrate through the separator to cause an internal short circuit, which may generate a lot of heat and thus lead to explosion of the battery. In addition, the surface area increases according to the cycles to degrade the electrolytic solution, and repeated destruction and regeneration of the SEI layer bring a loss of lithium (deterioration of Coulombic efficiency). In order to prevent these problems, it is essential to form an artificial SEI layer capable of effectively protecting the LiM anode or applying an additive to the electrolytic solution. Various ultra-thin film layers made of graphene and ceramic are formed on the surface of the LiM as described above to serve as a stable artificial SEI layer and suppress generation and perforation of lithium dendrite and side reactions.

In order to solve the above problems of the LiM, an ultra-thin film, namely a high-quality film, is required to successfully make an artificial SEI layer which may separate lithium and an electrolytic solution from each other and allows rapid passage of lithium ions. Since lithium is sensitive to the air and moisture, an easy and inexpensive method is essentially required for industrial applicability. First, an ultra-thin film of graphene and ceramic is coated on an aluminum foil in the atmosphere, and a uniform pressure is applied between the lithium and the coating layer by means of a rolling press to coat the prepared film on a LiM. This process may be performed in a dry room in order to prevent oxidation of the LiM.

Hereinafter, the present disclosure will be described in more detail using examples, but the scope and content of the present disclosure should not be restricted or limitedly interpreted due to the examples. In addition, based on the present disclosure including the examples, it would be obvious that the present disclosure can be easily implemented by those skilled in the art even though detailed experimental results are not proposed, and such changes and modifications also fall within the scope of the appended claims.

In addition, the experimental results proposed herein are just representative experimental results of Examples and Comparative Examples, and effects of various embodiments of the present disclosure not proposed herein will be described in detail in appropriate portions.

EXAMPLES

Example 1

(1) Composing of Materials

In the present disclosure, an artificial SEI layer for a lithium metal anode was prepared using graphene oxide, nitrogen-doped graphene oxide, reduced graphene oxide, graphene nanoparticle, graphene powder, crumpled graphene oxide, crumpled reduced graphene oxide, crumpled reduced graphene oxide having titania nanoparticle, general titania nanopowder, and lithium-terminated sulfonated titania nanopowder. All graphene materials except for graphene nanoparticle and graphene powder were prepared by means of an improved modified Hummer's method.

In detail, graphite pieces were dispersed in a concentrated sulfuric acid and cooled to 0° C., and then a $KMnO_4$ solution was added thereto while being kept at a temperature of 10° C. or below. Also, a distilled water and peroxide were added thereto, and the suspension was filtered several times using deionized water, thereby obtaining graphene oxide. The graphene nanoparticle was obtained by strongly pulverizing carbon nanotube at a ball mill, and the graphene powder was selected as a general product provided by XG Science. The titania nanoparticle (20 to 50 nm, 99% purity, rutile, Advanced Materials™) was functionalized using 3-(trihydroxysilyl)-1-propane sulfonate (Gelest). Here, titania nanoparticle was dispersed in water and treated with ultrasonic wave for about 30 minutes, and 3-(trihydroxysilyl)-1-propane sulfonated was applied thereto to have pH 2.0 and left for a day at room temperature. Also, for lithium termination, LiOH was added to have pH 7.0. In order to remove an excessive amount of lithium-terminated 3-(trihydroxysilyl)-1-propane sulfonate, functionalized particles were centrifugally separated 10 times with deionized water and finally washed with ethanol. The obtained final particles were left in a dry oven for a day at 60° C.

(2) Preparation of Film

A well-dispersed nanomaterial suspension was prepared by mixing desired nanomaterial (3 wt % or below) with ethanol and dispersing the same for 30 minutes by means of ultrasonic wave, and an ultra-thin film of nanomaterial was formed using a commercial aluminum foil as a substrate. The substrate was immersed in water, and the nanomaterial suspension was applied to a container containing water. If about 30% or less of water surface is covered by a self-assembled film, the substrate was slowly lifted up so as to be coated with the self-assembled film on the water surface, and also the suspension is consistently applied so that the self-assembled film is maintained at the water surface. The coated substrate was located at a hot plate kept at 120° C. for 1 minute to remove moisture. This process was repeated to obtain a desired number of layers.

(3) Transfer of Film

The film prepared on the aluminum foil was transported to a surface of a lithium metal by using a rolling press. In a dry condition, the lithium metal and the prepared film were placed into a sandwich form together with a polycarbonate film, and then a uniform pressure was applied thereto at the rolling press. At this time, an interval of pressing cylinders was adjusted to be 50% to 90% of an entire thickness of all layers, and a roll rotation speed was maintained to be 0.1 cm/sec to 1 cm/sec. After compression, the polycarbonate film was removed, the aluminum foil adhered to the lithium metal was peeled off, and then the lithium coated with nanoparticle was cut to measure electrochemical characteristics.

(4) Electrochemical Analysis of the Protection Film Coated Lithium Metal

In order to investigate electrochemical characteristics of the lithium metal having the artificial SEI layer, constant-current stripping/plating measurements were performed, and the change of potential was measured from a symmetric cell. Stripping and plating were performed with various current densities (1 to 5 mA/cm$^2$) and various capacities (1 to 2 mAh/cm$^2$), and in order to understand the artificial SEI layer, four kinds of electrolytic solutions as follows were used: carbonate and ether-based electrolyte (various additives were used, ① 1 M LiPF$_6$ 2 wt % VC in EC:DMC) (1:1 v:v), ② 1M LiPF$_6$ in EC:EMC, ③ 1 M LiTFSI 0.1 M LiNO$_3$ 0.05 M CsNO$_3$ DME (dimethoxyethane):DOL (dioxolane) (1:1 v:v), and 1 M LiTFSI 0.1 M LiNO$_3$ DME:DOL (1:1 v:v)).

In order to measure Coulomb efficiency, the modified lithium metal was used as an anode, and the modified copper was used as a cathode. Also, two different electrolytes were used as follows: ① 1 M LiTFSI 0.1 M LiNO$_3$ 0.05 M CsNO$_3$ DME (dimethoxy ethane):DOL (dioxolane) (1:1 v:v), ② 1 M LiTFSI 0.1 M LiNO$_3$ DME:DOL (1:1 v:v). A Celgard 2500 separator and 0.3 mL of electrolytic solution were used, and measurement was performed after being assembled into a coin cell. During a discharge process (Li is plated to a Cu plate), 1 mA/cm$^2$ of constant current was used for 1 hour to have a plating capacity of 1 mAh/cm$^2$. During a charge process, 1 mAh/cm$^2$ of constant current was applied to reach 2 V. Coulomb efficiency for lithium stripping/plating was measured while repeating charging and discharging, and the efficiency was calculated by dividing a charging time by a discharging time.

In order to measure AC impedance, a frequency range of 1 MHz to 0.1 Hz was selected, and a symmetric cell was assembled using a modified lithium metal, Celgard 2500 separator, and 0.3 mL 1 M LiTFSI 0.1 M LiNO$_3$ 0.05 M CsNO$_3$ DME:DOL (1:1 v:v) electrolytic solution. Measurement was performed before electrochemical cycles.

What is claimed is:

1. A preparation method of a composite layer, comprising:
   (A) forming at least one Langmuir-Blodgett artificial SEI layer on a substrate by performing a process of moving a Langmuir-Blodgett artificial SEI layer dispersed on a surface of a dispersion medium onto the substrate and drying the moved thin film layer at least once, and
   (B) transferring the at least one Langmuir-Blodgett artificial SEI layer formed on the substrate onto an alkali metal,
   wherein the at least one Langmuir-Blodgett artificial SEI layer is made of the same material or different materials, independently selected from the group consisting of graphene nanoparticle, nitrogen-doped graphene oxide, graphene oxide, lithium-terminated sulfonated titania nanopowder, reduced graphene oxide, graphene powder, crumpled graphene oxide, crumpled reduced graphene oxide, crumpled reduced graphene oxide with titania nanoparticle, titania nanopowder, and mixtures thereof, and
   wherein when two or more Langmuir-Blodgett artificial SEI layers are included, two Langmuir-Blodgett artificial SEI layers adjacent to each other are made of the same material or different materials,
   wherein the step (B) is performed by pressing the alkali metal and the substrate to be closely adhered to each other so that the alkali metal and the Langmuir-Blodgett artificial SEI layer become adjacent to each other, and
   wherein the pressing is performed by moving the alkali metal and the substrate, closely adhered to each other, through a rolling press in a state where protection films are placed at front and rear portions thereof.

2. A preparation method of a composite layer, comprising:
   (A) forming at least one Langmuir-Blodgett artificial SEI layer on a substrate by performing a process of moving a Langmuir-Blodgett artificial SEI layer dispersed on a surface of a dispersion medium onto the substrate and drying the moved thin film layer at least once, and
   (B) transferring the at least one Langmuir-Blodgett artificial SEI layer formed on the substrate onto an alkali metal,
   wherein the at least one Langmuir-Blodgett artificial SEI layer is made of the same material or different materials, independently selected from the group consisting of graphene nanoparticle nitrogen-doped graphene oxide, graphene oxide, lithium-terminated sulfonated titania nanopowder, reduced graphene oxide, graphene powder, crumpled graphene oxide, crumpled reduced graphene oxide, crumpled reduced graphene oxide with titania nanoparticle, titania nanopowder, and mixtures thereof,
   wherein when two or more Langmuir-Blodgett artificial SEI layers are included, two Langmuir-Blodgett artificial SEI layers adjacent to each other are made of the same material or different materials,
   wherein in the step (A), the Langmuir-Blodgett artificial SEI layer is moved by lifting up the substrate immersed in the dispersion medium so that the Langmuir-Blodgett artificial SEI layer covers the substrate, and
   wherein in the step (A), when the substrate is lifted up, a suspension made of the same material as the Langmuir-Blodgett artificial SEI layer is simultaneously put into the dispersion medium,
   wherein the step (A) is performed when the Langmuir-Blodgett artificial SEI layer occupies 30% to 90% of the surface of the dispersion medium.

3. The preparation method of a composite layer according to claim 2,
   wherein the suspension has a concentration of 0.5 to 5 wt %.

4. The preparation method of a composite layer according to claim 2,
   wherein the suspension is put so that an area ratio of the surface of the dispersion medium, occupied by the Langmuir-Blodgett artificial SEI layer, is maintained to be 30% to 90% in comparison to an initial area.

5. The preparation method of a composite layer according to claim 2,
   wherein the dispersion medium is water, and a suspension medium of the suspension is ethanol.

6. The preparation method of a composite layer according to claim 1,
   wherein the step (B) is performed by means of roll pressing.

7. The preparation method of a composite layer according to claim 1,
   wherein an interval of pressing cylinders of the rolling press is adjusted to be 50% to 90% of an entire thickness of layers put between press rolls, and a roll rotation speed is maintained to be 0.1 cm/sec to 1 cm/sec.

8. The preparation method of a composite layer according to claim 1,
wherein the step (B) further includes removing the substrate from the alkali metal to which the Langmuir-Blodgett artificial SEI layer is transferred.

9. A preparation method of a composite layer, comprising:
(A) forming at least one Langmuir-Blodgett artificial SEI layer on a substrate by performing a process of moving a Langmuir-Blodgett artificial SEI layer dispersed on a surface of a dispersion medium onto the substrate and drying the moved thin film layer at least once, and
(B) transferring the at least one Langmuir-Blodgett artificial SEI layer formed on the substrate onto an alkali metal,
wherein the at least one Langmuir-Blodgett artificial SEI layer is made of the same material or different materials, independently selected from the group consisting of graphene nanoparticle, nitrogen-doped graphene oxide, graphene oxide, lithium-terminated sulfonated titania nanopowder, reduced graphene oxide, graphene powder, crumpled graphene oxide, crumpled reduced graphene oxide, crumpled reduced graphene oxide with titania nanoparticle, titania nanopowder, and mixtures thereof, and
wherein when two or more Langmuir-Blodgett artificial SEI layers are included, two Langmuir-Blodgett artificial SEI layers adjacent to each other are made of the same material or different materials, and
wherein the step (B) is performed under a dry environment with a relative humidity of 0% to 1%.

10. The preparation method of a composite layer according to claim 5,
wherein the substrate is an aluminum foil, and the protection film is a polycarbonate film.

11. The preparation method of a composite layer according to claim 10,
wherein the alkali metal is lithium, and
wherein the composite layer is a lithium metal anode.

12. The preparation method of a composite layer according to claim 1,
wherein the alkali metal is lithium, and
wherein the composite layer is a lithium metal anode.

13. The preparation method of a composite layer according to claim 2,
wherein the alkali metal is lithium, and
wherein the composite layer is a lithium metal anode.

* * * * *